US006750884B1

(12) United States Patent
Steigerwald et al.

(10) Patent No.: US 6,750,884 B1
(45) Date of Patent: Jun. 15, 2004

(54) INSTRUCTION PRESENTATION APPARATUS

(75) Inventors: Mark B. Steigerwald, East Syracuse, NY (US); Jeffrey J. Steigerwald, East Syracuse, NY (US); J. Scott Buehler, Weedsport, NY (US)

(73) Assignee: Red Oak Knowledge Systems, Inc., Syracuse, NY (US)

( * ) Notice: Subject to any disclaimer, the term of this patent is extended or adjusted under 35 U.S.C. 154(b) by 0 days.

(21) Appl. No.: 09/427,423

(22) Filed: Oct. 26, 1999

(51) Int. Cl.[7] ................................................ G09G 5/00
(52) U.S. Cl. ...................................... 345/771; 345/762
(58) Field of Search ................................ 345/707, 705, 345/708, 854, 822, 771, 762, 763, 778, 866; 434/219

(56) References Cited

U.S. PATENT DOCUMENTS

| | | | |
|---|---|---|---|
| 4,586,905 A | | 5/1986 | Groff ........................... 434/307 |
| 4,899,292 A | * | 2/1990 | Montagna et al. ........ 707/104.1 |
| 5,212,635 A | * | 5/1993 | Ferriter ......................... 705/11 |
| 5,286,202 A | | 2/1994 | de Gyarfas et al. ............ 434/43 |
| 5,293,479 A | * | 3/1994 | Quintero et al. ............. 345/841 |
| 5,412,758 A | | 5/1995 | Srikanth et al. ............... 706/59 |
| H1452 H | | 6/1995 | Kennedy ..................... 434/322 |
| 5,687,331 A | * | 11/1997 | Volk et al. ................... 345/716 |
| 5,854,850 A | | 12/1998 | Linford et al. ............... 382/128 |
| 6,033,226 A | * | 3/2000 | Bullen ......................... 434/219 |
| 6,052,631 A | * | 4/2000 | Busch et al. ................... 701/29 |
| 6,128,013 A | * | 10/2000 | Prabhu et al. ............... 345/707 |
| 6,397,131 B1 | * | 5/2002 | Busch et al. ................... 701/29 |

* cited by examiner

Primary Examiner—John Cabeca
Assistant Examiner—Tadesse Hailu
(74) Attorney, Agent, or Firm—Wall Marjama & Bilinski LLP

(57) ABSTRACT

The invention is an instruction presentation apparatus adapted to present a series of instruction screen displays to a user according to a predetermined sequence. Each instruction screen display includes both textual information describing the work to be done during execution of an instruction and graphical information correlated with the textual information graphically illustrating the machine that is worked on during execution of the instruction. The apparatus is configured to withhold display of a next instruction screen display in a series of instruction screen displays until the apparatus receives a user initiated command to display a next instruction screen display. By withholding display of text and graphics pertaining to an instruction until receipt of a user initiated command, and by simultaneously presenting textual and graphical information particularly associated with that textual information for each instruction that is executed, the apparatus significantly enhances a user's ability to comprehend each instruction and to maintain attention on the instruction presently being executed.

152 Claims, 19 Drawing Sheets

INSTRUCTION PRESENTATION APPARATUS

FIELD OF THE INVENTION

The present invention relates generally to selective visual display systems and particularly to an instruction presentation apparatus adapted to interactively present correlated textual and graphical instructional information to a user of a machine.

BACKGROUND OF THE PRIOR ART

The cost of down time for the complex machines used in many types of industrial manufacturing and other industrial processes is extremely expensive. For example, down time on Automobile Industry paint lines and Stamping Lines cost $2,000 to $5,000 per minute.

This problem is exacerbated by the fact that most plants in the auto industry are operating at capacity. Plants running at capacity have no "excess capacity" available to catch-up or make-up for production lost due to down time. Any part that is not produced, or sale that is lost, is a part or sale that can not be recovered because there is no excess capacity available to recover it. Modern manufacturing concepts like "Just-in-Time" inventories mean that there are very few reserve parts in stock. If production is lost for more than 30 to 60 minutes there is a measurable adverse effect on downstream production operations. Modern manufacturing machines are themselves becoming increasingly complex. Global competition is forcing quality to improve. This causes machining tolerances to be significantly tighter and hard to achieve. New machines have been designed to meet these challenges, but they are significantly more complex than prior machines. If these machines are inoperative for even a short amount of time, large and irrecoverable losses will be realized. Therefore, even seemingly modest improvements in down time can be very important. Just as importantly, making repair procedures even slightly easier to comprehend can make the difference between factory workers fixing a problem quickly instead of experiencing lengthy down time.

For as long as modern factories have been in existence, factory workers have attempted to fix machine problems with the aid of paper-based instruction manuals. Unfortunately, traditional paper-based instruction manuals exhibit severe limitations. These problems have become more severe as machinery has grown more complex.

The biggest problem with traditional paper-based instruction manuals is that they present information passively. In other words, all of the information is there in front of a worker all of the time. Workers themselves are 100% responsible for keeping track of where they are in a procedure. This presents a problem in long complex procedures, because it makes it easy for a worker to inadvertently skip over a step without realizing it.

Workers could learn and memorize repair procedures on the older machines because they only had 30 to 50 procedures for fixing problems. Modern computer controlled machines routinely have 500 to 2000 fault codes. Each fault code has its own 30 to 100 step procedure that must be precisely followed to repair the machine. This is too much for an average factory worker to memorize.

Workers can easily skip over steps without realizing it because they are unfamiliar with the procedure. If they were familiar with the procedure they would not be referencing it in a technical instruction. Therefore it is safe to say that workers that need to refer to a procedure in a technical instruction are unfamiliar with that procedure. It follows that these workers would not realize that they skipped a step until they tried to power up their machine and it failed to power up.

Another serious limitation of traditional paper-based instruction manuals is that graphics are frequently on a different page than the textual step. This forces a worker to flip pages to see the graphic. Flipping pages makes it more likely that a worker will skip steps as they work their way through a long procedure. If constant page flipping annoys the worker too much they may not even reference the graphic and it's "explanation value" will be lost.

The same type of problems experienced with use of traditional paper-based instruction manuals are also experienced with use of presently available electronic computer-based instruction manuals. The biggest problem with presently available computer-based instruction manuals is that users have to "click" back and forth between text screens and graphic screens. Clicking back-and-forth over and over is confusing for most factory workers. It makes following a complex procedure difficult.

Some computer-based instruction manuals and internet web pages have tried to solve this problem by allowing the worker to "scroll" down through a procedure. While this is better than clicking back-and-forth it still makes the factory worker perform three actions; 1) Keep track of where they are in the procedure all by themselves, 2) Click to scroll, and 3) Click for a graphic. This approach does nothing to reduce the risk of a worker skipping over a step in a procedure and not realizing it because it is not conceptually different than the approach used for traditional paper-based instruction manuals. It is still the traditional "paper approach" even though it is accessed by, and displayed on, a computer display screen.

Any time a worker has to scroll between steps in a procedure in a computer based instruction manual the worker runs a big risk of skipping a step when he looks away to perform a task, and then looks back at the computer screen. Additionally, any time a worker has to click to see a graphic he also runs the risk of getting lost or not using the graphic.

There is a need for new methods and apparatuses for aiding users in the operation, assembly and repair of complex machines.

SUMMARY OF THE INVENTION

According to its major aspects and broadly stated, the present invention is an instruction presentation apparatus adapted to display correlated/textual and graphical information to a user of a machine according to a predetermined sequence.

The instruction presentation apparatus is adapted to display to a user, in accordance with a predetermined ordering, a plurality of preconfigured instruction screen displays. Each instruction screen display of the apparatus includes both textual and complementary graphical information pertaining to a particular instruction of a process related to a machine. Typically, the textual information of each instruction screen display describes the work to be performed on a machine during execution of the instruction, while correlated graphical information of each instruction screen display, in one embodiment, graphically illustrates the machine that is worked on combined with highlight indicia highlighting the particular area of the machine that is worked on during execution of the instruction described in the text section of the instruction screen display. An apparatus according to the invention displays one instruction screen display at a time and does not display an instruction screen display pertaining to a next instruction until the apparatus receives a user-initiated command to display the next instruction screen display.

By withholding display of text and graphics pertaining to an instruction until receipt of a user initiated command, and by simultaneously presenting textual information and graphical information particularly associated with that textual information for each instruction that is to be executed, the apparatus significantly enhances a user's ability to comprehend each instruction and to maintain attention on the instruction presently being executed.

The highlight indicia which highlights the area of a machine to be acted on during execution of an instruction may take on a variety of forms. For example, an instruction screen display's highlight indicia may comprise an arrow or border indicating the area of the machine to be worked on. If the instruction involves use of a specific tool type on a certain area of the machine, then the highlight indicia may comprise a graphic illustration of the tool as applied to a certain area of the machine. If the instruction involves assembly of a machine, then graphical information of the instruction screen display may include assembly state indicia which illustrates a machine in an assembled state after execution of the present or previous instruction. If an instruction involves disassembly of a machine, then text information of the instruction screen display may include assembly state indicia which illustrates a machine in a disassembled state after execution of the instruction These and other details, advantages and benefits of the present invention will become apparent from the detailed description of the preferred embodiment hereinbelow.

DETAILED DESCRIPTION OF THE INVENTION

Figure 1A:
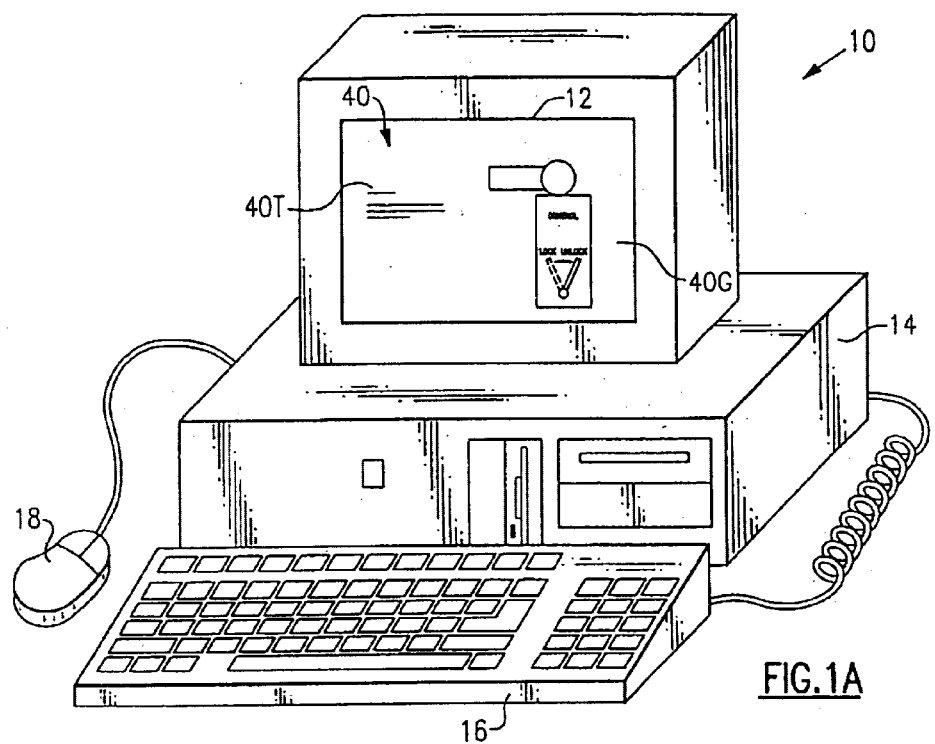
FIG. 1A is a physical schematic diagram of the apparatus as implemented in a conventional personal computer.
Figure 1B:
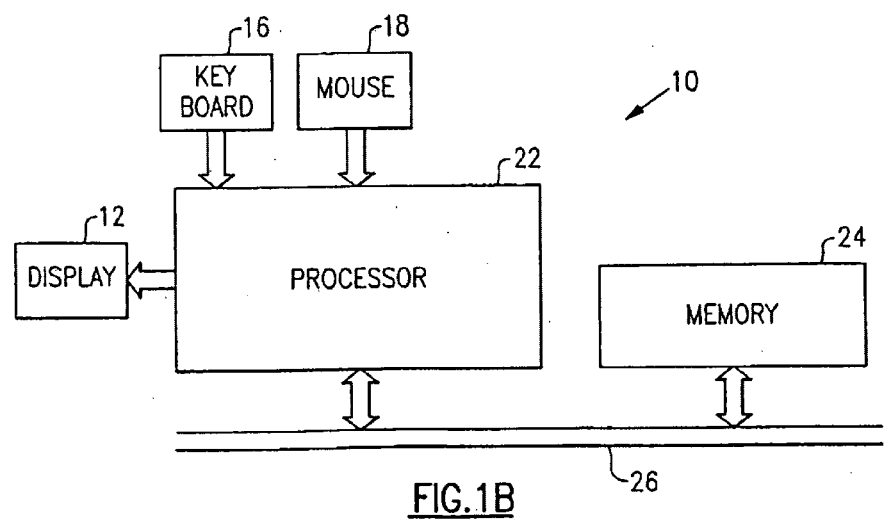
FIG. 1B is a block electrical diagram of the invention.

As is illustrated by FIGS. 1A and 1B, an instruction presentation apparatus 10 according to the invention can be incorporated in a conventional personal computer system having a display monitor 12, a processor housing 14 and input devices such as a keyboard 16 and mouse 18. Referring to block electrical diagram of FIG. 1B, housing 14 houses a processor system which comprises typically a processor 22 such a microprocessor and a system memory 24 in communication with processor 22 via system bus 26 which may include a plurality of memory devices including volatile and nonvolatile memory devices. Processor 22 operates under the control of a program stored in memory 24 and receives user input commands and data from data input devices such as keyboard 16 and mouse 18. In the present invention, processor 22 operates under the control of a program to control output of display screen 12, shown as being provided by a CRT monitor according to a predetermined protocol. Display screen 12 could also be provided, for example, by an LCD display screen, or a flexible transistor-based electronic paper type display screen.

As is well known to skilled artisans, a program comprising instructions recognizable by processor 22 enabling the processor system to operate in accordance with a certain protocol may be stored on a transportable memory device such as a floppy disk or compact disk. Processor 22 may read the program instructions directly from the transportable memory device in which case the transportable device forms part of memory 24 of the system, or else processor 22 can read an entire set of program instructions from the transportable storage device, write the entire set of instructions into a non-transportable memory device storage location of memory 24, and execute the instructions by reading them from the non-transportable memory device storage location without further reading of the instructions from the transportable memory device.

While the invention is shown as being implemented in a stationary personal computer, it will be understood that it will be useful and preferred in many instances to implement the invention in a portable processor system such as one located in a laptop personal computer so that the processor system can readily be moved in close proximity with the machine being worked on. Furthermore, as such devices become more powerful, it is expected that the invention will find increased use in processor systems of miniature hand-held (sometimes referred to as palm-held) personal computers. In the case that the invention is implemented in a portable computer, it is useful to implement wire, cable, fiber optic, or wireless communications hardware in the portable computer so that programs in accordance with the invention can readily be downloaded into the portable computer system from a local host computer system located remotely from the portable computer. In addition, numerous available high speed communications technologies would allow the invention to be implemented in a processor system that is in communication with a remote portable display screen located remotely from a processor system controlling the display of textual and graphical information on the display screen. Since various options for communications systems which may be implemented in computer systems supporting the invention are well known and commonly available, they will not be discussed in detail herein.

It will also be understood that the invention can be implemented in a local stationary or portable computer system that is in communication with a remote computer system or network and which is configured to display, on receipt of commands issued at the stationary or portable computer system, display screens residing in the memory of a computer system located remotely from the local stationary or portable computer system. An internet implementation of the invention, which will be explained more fully herein below, is one form of this type of implementation.

Instruction presentation apparatus 10 is adapted to display to a machine user, in accordance with a predetermined ordering, a series of preconfigured instruction screen displays. A "user" of a machine herein may be, for example, an assembler, a repairer, or an operator of a machine. Each instruction screen display such as instruction screen display 40 of apparatus 10 includes both textual information 40T and complementary graphical information 40G pertaining to a particular instruction of a process related to a machine. The text information 40T is sometimes referred to herein as the "text section" of instruction display while the graphical information is sometimes referred to herein as the "graphical section" of an instruction screen display. Typically, the textual information 40T of each instruction screen display 40 describes the work to be performed on a machine during execution of the associated instruction, while graphical information 40G of each instruction screen display 40 graphically illustrates the machine that is worked on. As will be seen herein, the graphical information 40G often includes highlight indicia 40H highlighting the particular area of the machine that is worked on during execution of the instruction described in the instruction screen display's text section. An apparatus according to the invention displays one instruction screen display at a time and does not display an instruction screen display pertaining to a next instruction until processor 22 receives a user-initiated command to display the instruction screen display of the next instruction.

By configuring apparatus 10 to withhold display of text and graphics pertaining to an instruction until a user enters a command to change the instruction screen display, and by configuring apparatus 10 to simultaneously present textual information 40T and correlated graphical information 40G particularly associated with that textual information for each instruction that is to be executed, apparatus 10 significantly enhances a user's ability to comprehend each instruction and to maintain attention on the instruction described and illustrated by the instruction screen display presently being output on display screen 12.

Figure 2A:
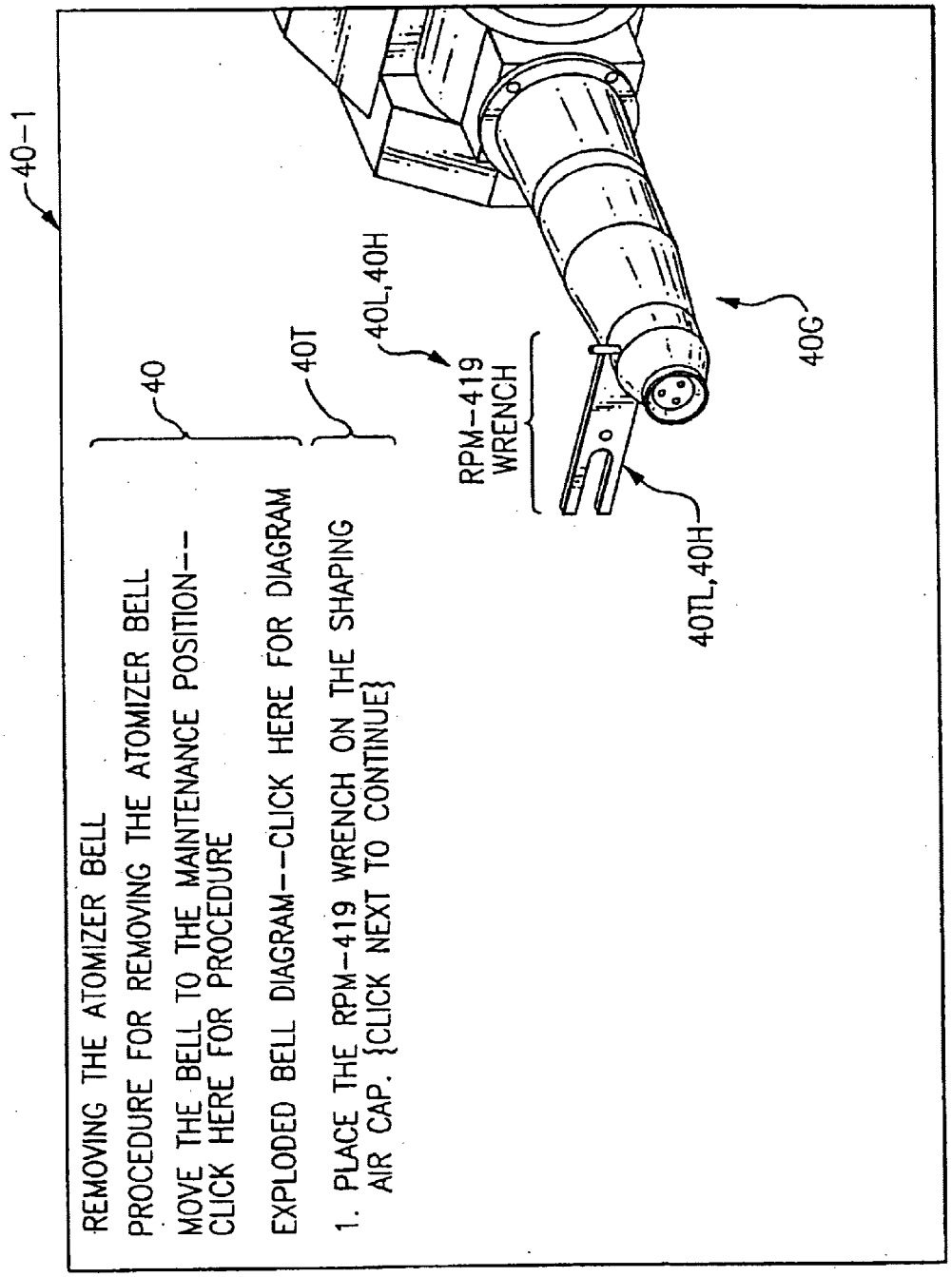
FIGS. 2A–2C illustrate instruction screen displays of a first exemplary embodiment of the invention.
Figure 2B:
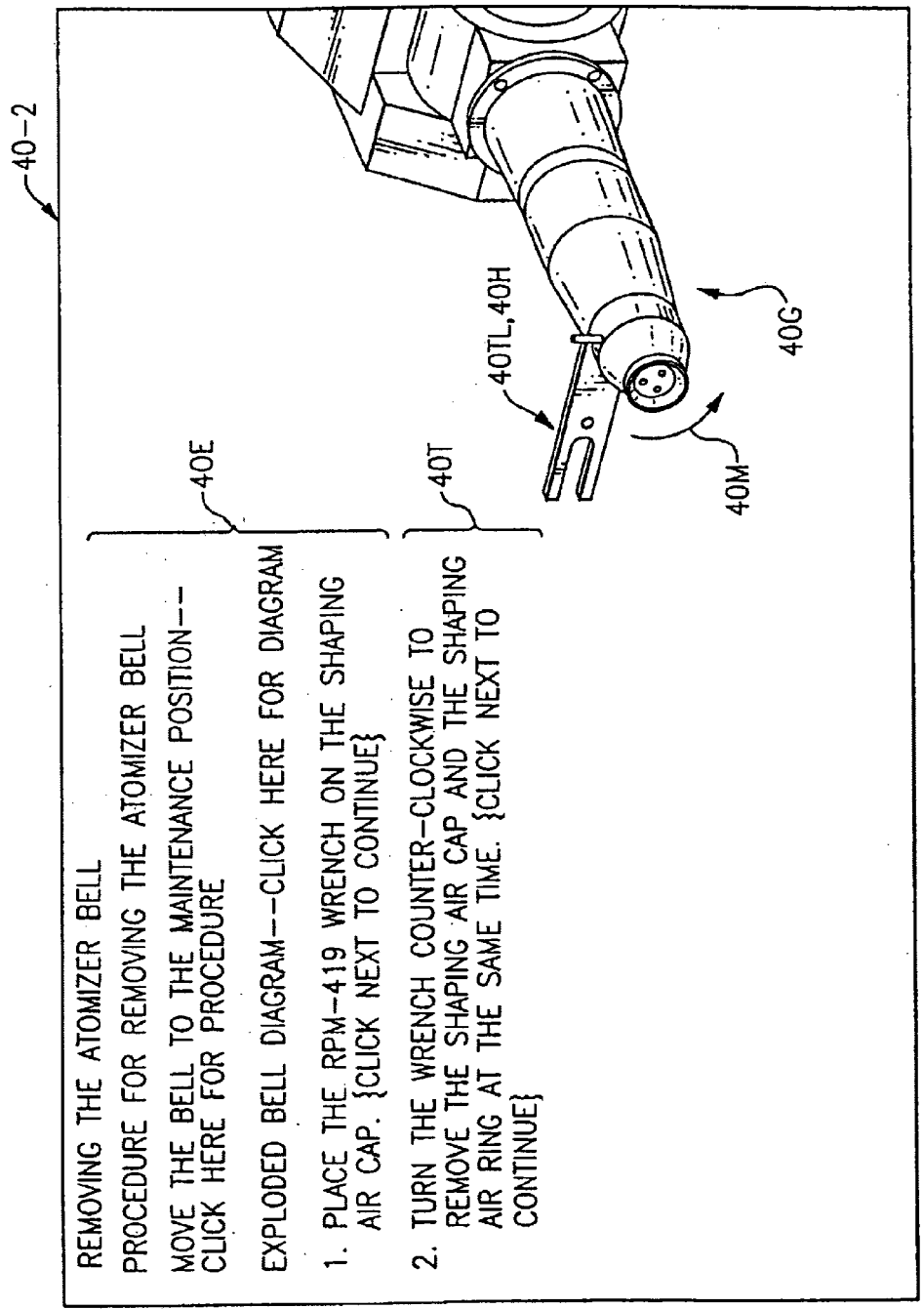
Figure 2C:
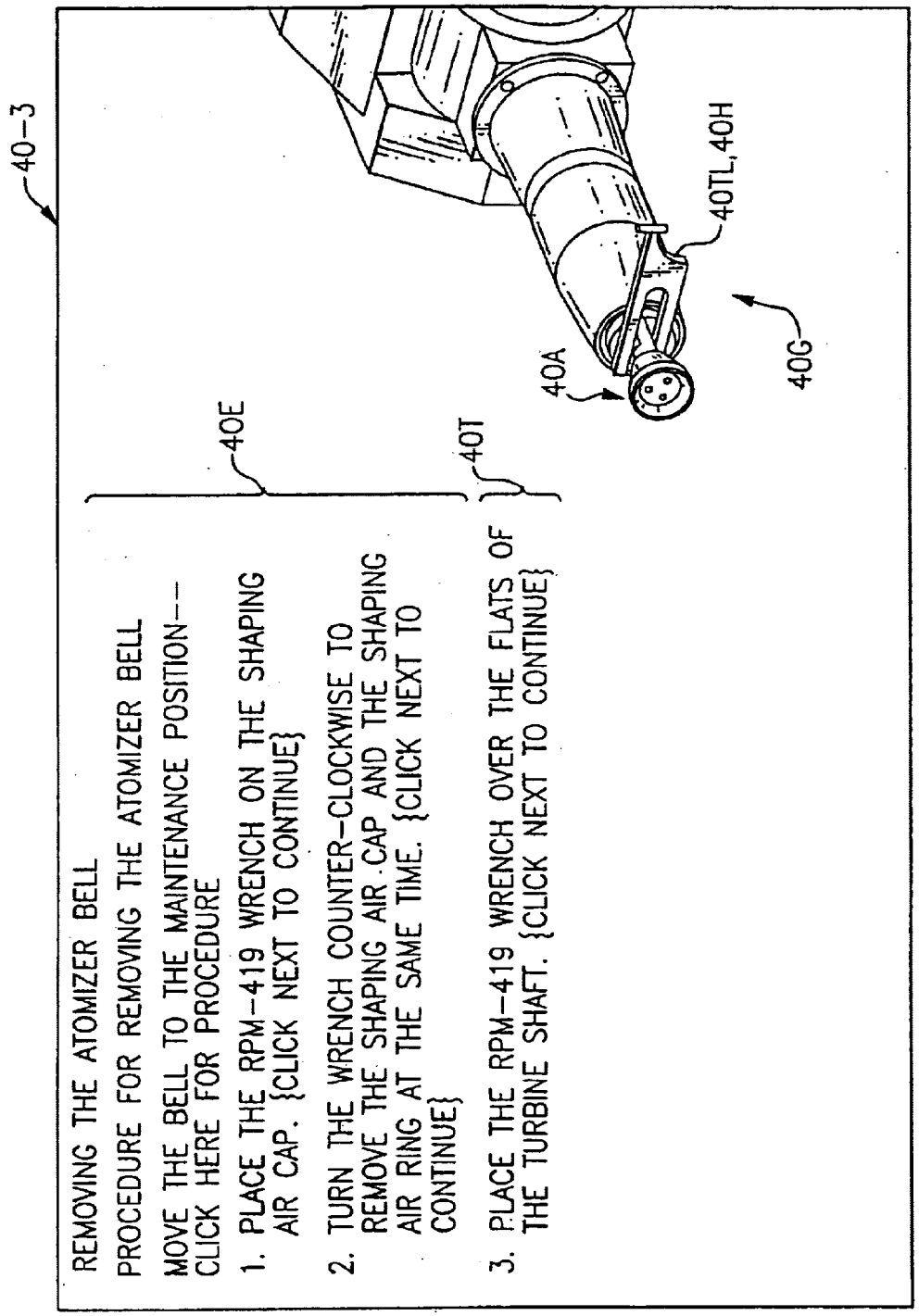

A first example of the invention is described with reference to FIGS. 2A–2C. The series of instruction screen displays 40-1, 40-2, 40-3 shown in FIGS. 2A–2C aid a machine user in a process involving the removal of a component part from an industrial machine. Each of the instruction screen displays 40-1, 40-2, 40-3 includes textual information 40T describing the work to be performed during execution of an instruction and complementary graphical information 40G graphically reinforcing and illustrating an aspect of the work described in the text information section 40T of the instruction screen display. In the example of FIGS. 2A–2C, each instruction screen display includes extraneous information 40E, in addition to the text section 40 of the instruction screen display describing the work to be performed during execution of the instruction. In the example of FIG. 2B, the additional information text 40E includes text left over from the previous instruction screen display. Presenting text information from a previous instruction or display helps a user to gain a fuller understanding of an overall process involving a machine. It will be understood, however, that it is not necessary that each instruction screen display include any text other than a text section 40T describing the work of a present instruction.

It is seen that the instruction screen displays 40-1, 40-2, 40-3 of FIGS. 2A–2C do not include any screen-displayed control buttons for facilitating the receipt of commands from a user to display a next instruction screen display. In cases where instruction screen displays do not include control buttons, it is typical to configure apparatus 10 to display a next instruction screen display on receipt of a user initiated command which is input via keyboard 16 (typically via arrow keys of the keyboard) or mouse 18.

Each of the instruction screen displays of FIGS. 2A–2C includes a different combination of graphical indicia types for illustrating the work to be performed during execution of a particular instruction. The instruction described and illustrating the instruction screen display of FIG. 1 involves positioning a specific type of tool (a wrench) onto a specific component of a machine that is worked on. For graphically illustrating this type of instruction, the graphical section 40G instruction screen display 40-1 includes highlight indicia comprising tool indicia 40T1 graphically illustrating the tool type and highlighting the positioning of the tool used in the instruction. The highlighted indicia of graphical section 40G of instruction screen display 40-1 further includes, in combination with tool indicia 40T1, label indicia 40L describing the a identification of the tool used during execution of the instruction. Label indicia can also be used to describe the identification of a part or area of the machine that is worked on.

Referring to FIG. 2B, the instruction described and illustrated by instruction screen display 40-2 is one involving the movement of a tool in a particular direction. For graphically illustrating this instruction, graphical section 40G of instruction screen display 40-2 includes a tool indicia 40T1 illustrating a tool that is used to carry out the instruction, and a movement indicia 40M illustrating the direction that the tool is moved during execution of the instruction. It will be seen that graphical information presented in an instruction screen display in accordance with the invention could also comprise movement indicia illustrating directional movement of the machine that is acted on, if the instruction described in the instruction screen display pertains to movement of a machine.

Referring to FIG. 3C, the instruction described and illustrated by instruction screen display 40-3 again involves positioning of a tool on a machine. Like the graphical section of instruction screen display 40-1 pertaining to an instruction involving the positioning of a tool, the graphical section 40G of instruction screen display 40-3 includes a highlight indicia 40H comprising tool indicia 40T1 illustrating a specific tool type and the proper positioning of the tool on a machine that is acted on. In addition to having tool indicia, it is seen that instruction screen display 40-3 further has assembly state indicia 40A, which herein refers to indicia which illustrates at least a part of a machine in a partially assembled, or alternatively, a partially disassembled state. Assembly state indicia 40A of instruction screen display 40-3 illustrates a part of a machine in a partially disassembled state. Instruction screen displays in accordance with the invention may include indicia which illustrate the state of assembly of a machine after execution of an instruction described in the present instruction screen display. In the alternative, as is illustrated by instruction screen display 40-3, assembly state indicia in accordance with the invention may also illustrate the state of assembly of a machine after execution of an instruction described in an immediately preceding instruction screen display. A component removal instruction is described by text section 40T of instruction screen display 40-2. The result of such removal is graphically displayed by graphical section 40G of the next displayed instruction screen display 40-3.

Figure 3A:
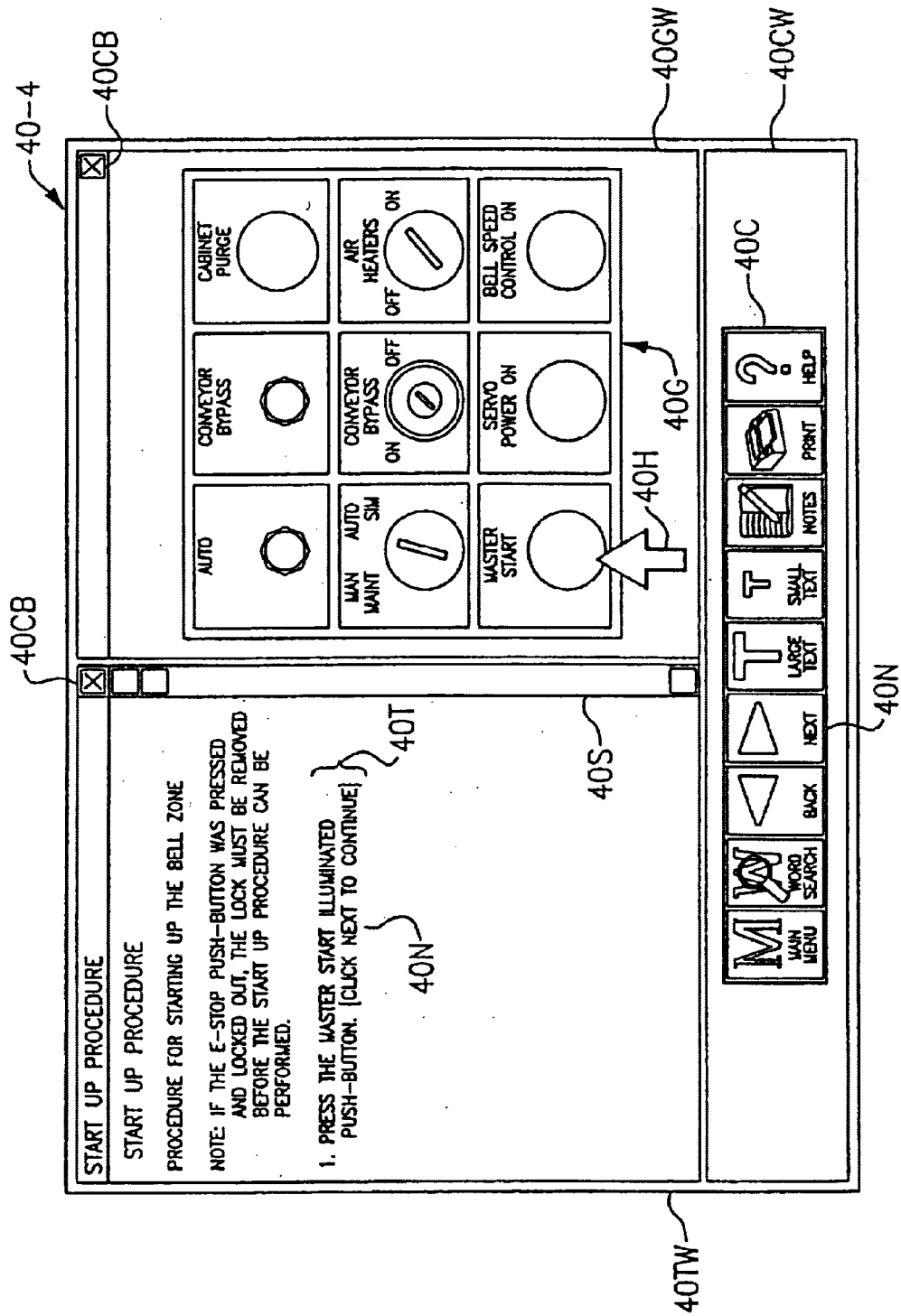
FIGS. 3A–3B illustrate instruction screen displays of an embodiment of the invention in which the graphical information of the instruction screen display pertains to a control panel.
Figure 3B:
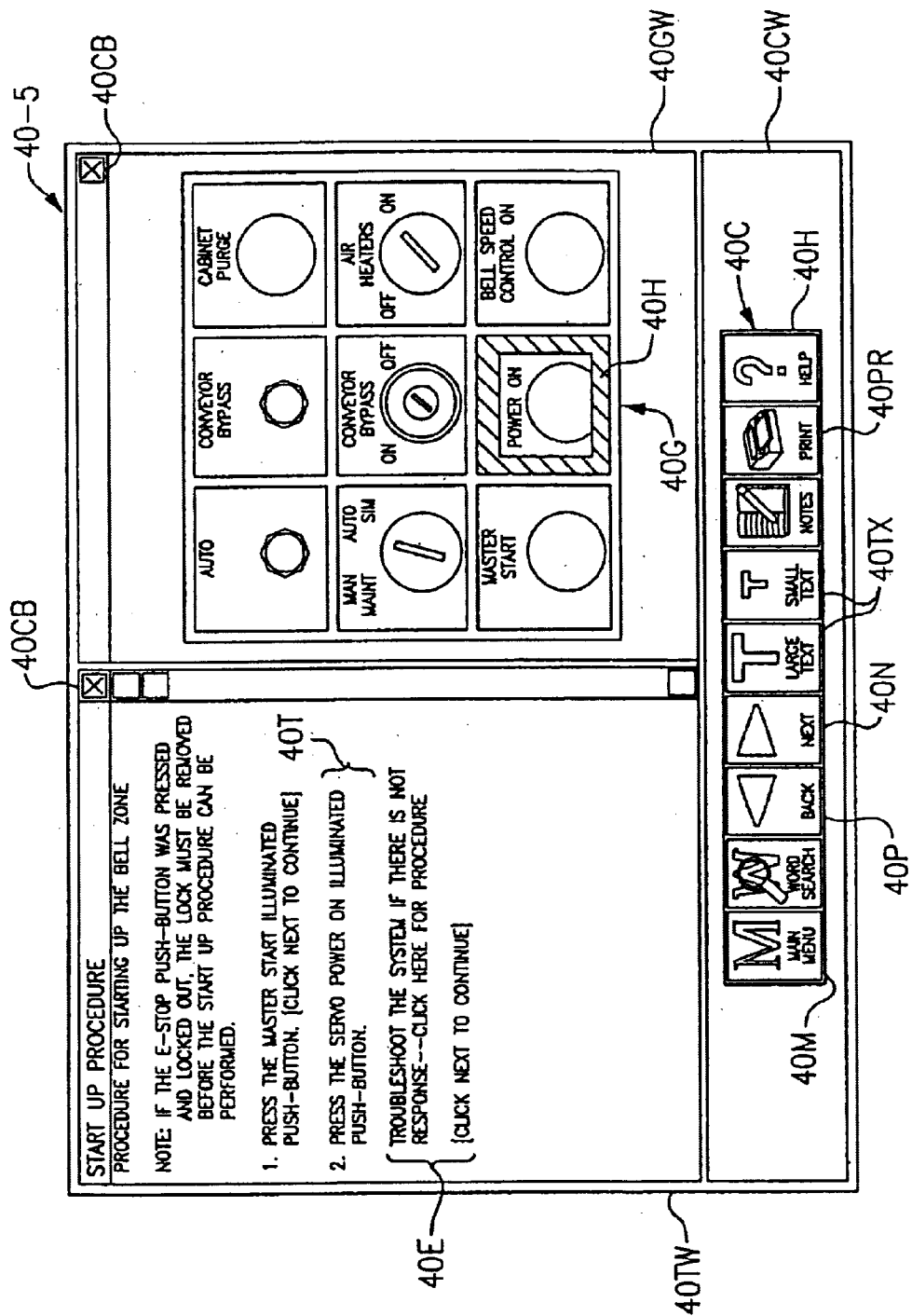

Another example of the invention is described with reference to FIGS. 3A–3B showing instruction screen displays 40-4, 40-5 which aid in a user imparting particularly prescribed control over a machine where the machine has or is a control panel having control buttons. Instruction screen displays 40-4, 40-5 describe and illustrate instructions involving the actuation of a particular push-button of a machine. The graphical section 40G of instruction screen display 40-4 and instruction screen display 40-5 both include highlight indicia 40H which are indicia that illustrate a particular area of a machine acted on during execution of an instruction. Highlight indicia 40H for illustrating a particular area of a machine to be acted on may take on a variety of forms. It is seen that the highlight indicia 40H of instruction screen display 40-4 comprises an arrow directed to a specific part of a machine illustration, while highlight indicia 40H of instruction screen display 40-5 comprises a border bounding a specific part of a machine illustration. The arrow 40H of display 40-4 and the border 40H of display 40-5 are forms of generic highlight indicia where as tool indicator 40Tl and label 40L of screen 40-1, for example, constitute specific highlight indicia. It will be understood that highlighted indicia for highlighting a specific area of a machine to be acted on may take on a virtually endless variety of forms.

Importantly, highlight indicia need not comprise additional graphical components such as arrows, borders, or tool depictors. Highlight indicia may comprise an area of a graphical machine depiction having an altered graphical display form. For example, a highlight indicia may comprise an area of a graphical depiction of a machine displayed with flashing graphics, or displayed in a different color or grey scale than the main body of the graphical depiction.

It is seen that instruction screen displays 40-3 and 40-4 both include a control bar 40C. As will be explained in more detail herein below, a user causes display of a next instruction screen display in the example of FIG. 3A–3B by clicking on (with use of mouse) the "next" button 40N of control bar 40C. In the alternative, a user could click on a redundantly provided "next" button 40N embedded in text window 40TW to cause display of a next instructor screen display as shown in FIG. 3A.

Figure 4A:
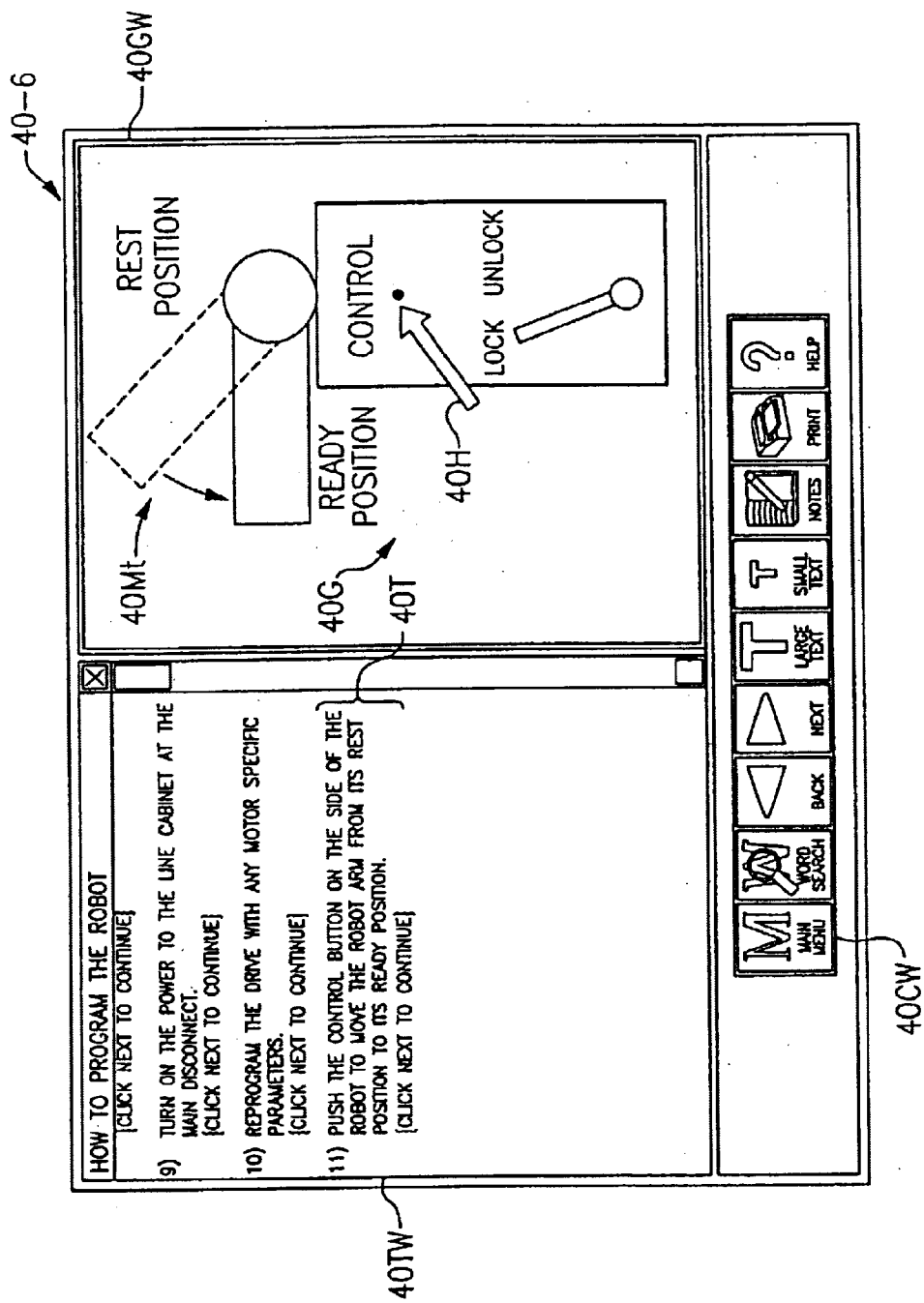
FIGS. 4A–4C illustrate instruction screen displays of an embodiment of the invention in which the graphical information of the instruction screen displays includes motion indicia indicating motion of a machine.
Figure 4B:
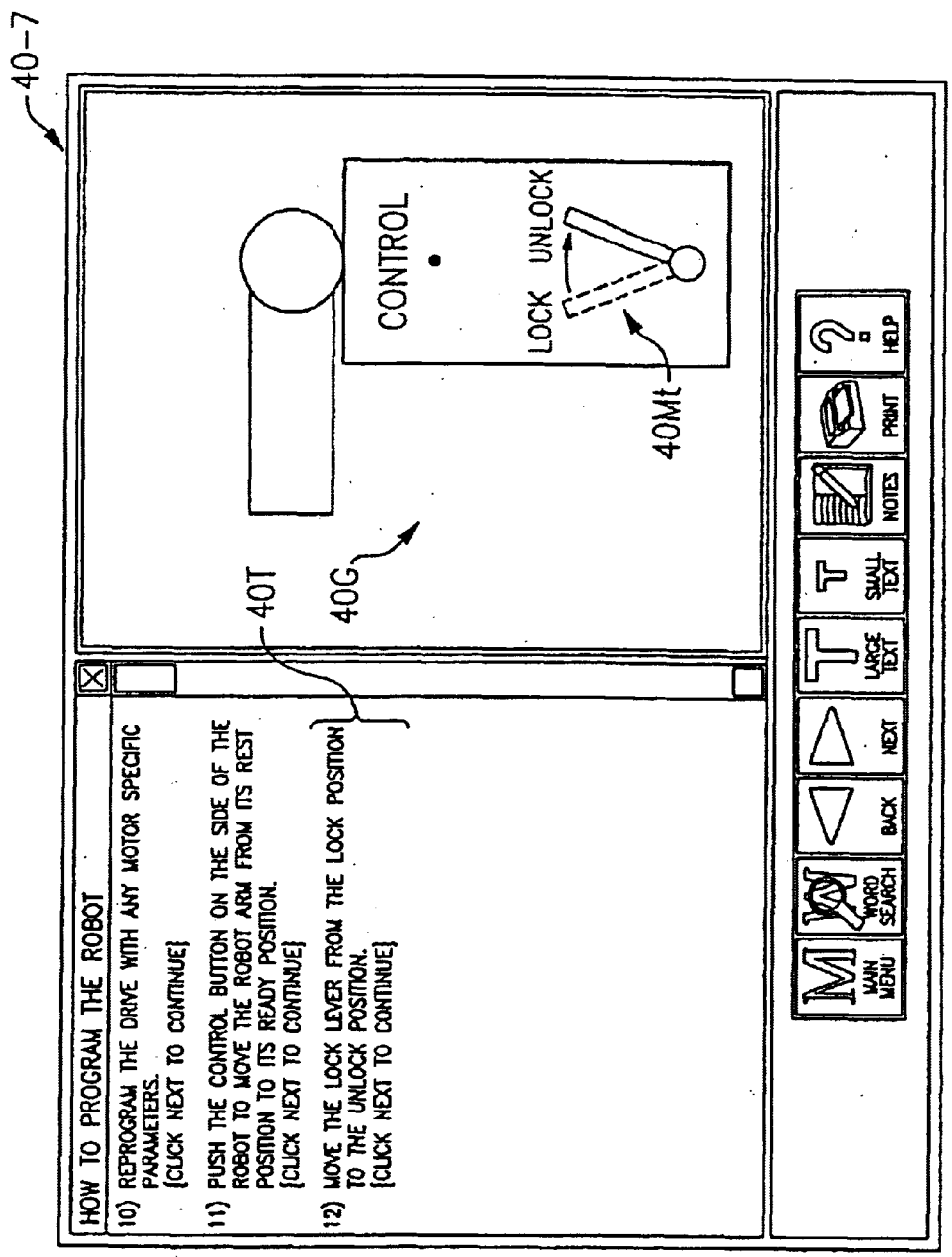
Figure 4C:
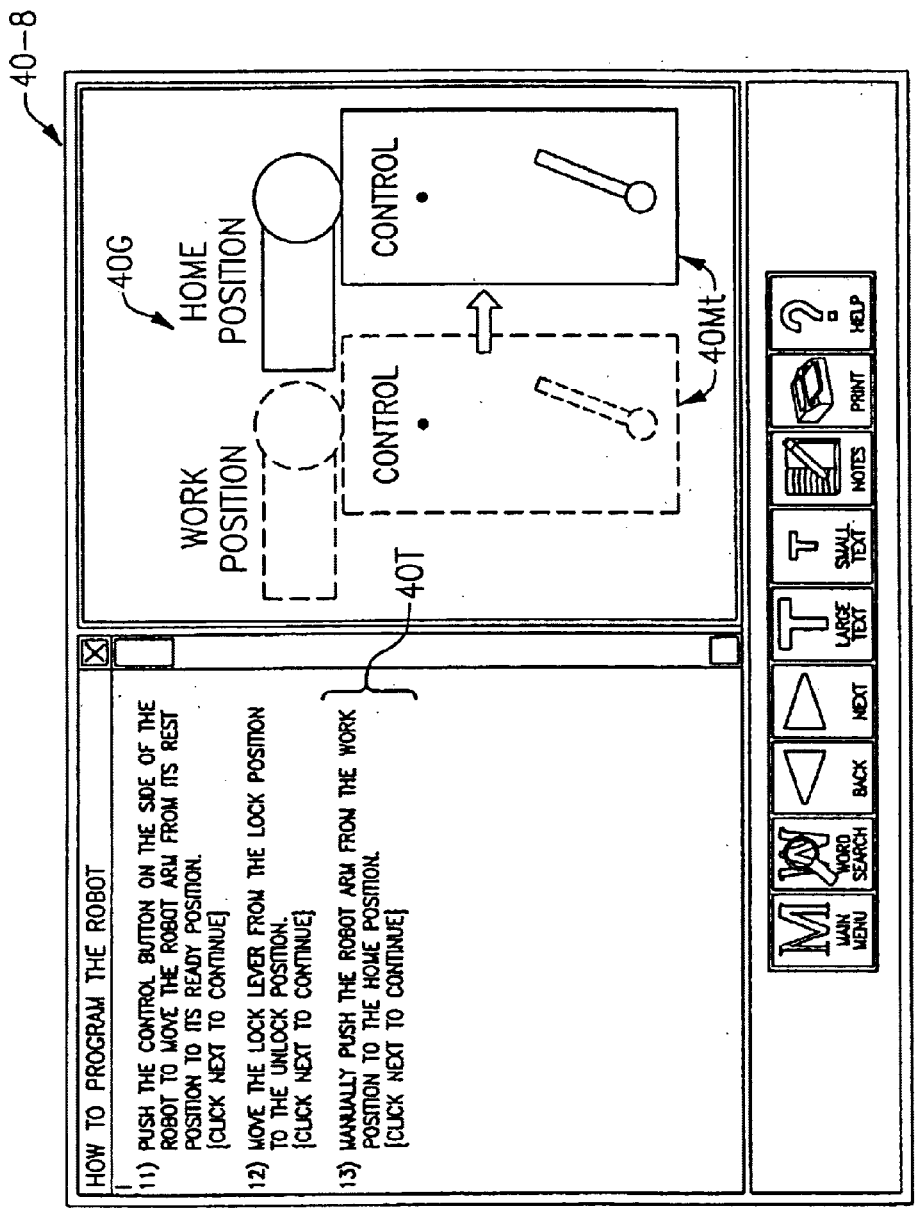

Additional embodiments of the invention are shown in FIGS. 4A–7C. In the embodiment of FIGS. 4A–4C, the graphical section 40G of each of the instruction screen displays 40-6, 40-7, 40-8 include motion indicia 40Mt for indicating the motion of a machine upon execution of an instruction. The motion indicia 40Mt of the instruction screen displays 40-6, 40-7, 40-8 include a dashed-in graphical image for illustrating a previous position of a component part or machine prior to execution of an instruction and a solid graphical image for illustrating a position of a component part or machine. It is seen that instruction screen display 40-6 includes a combination of highlight indicia 40H and motion indicia 40Mt for graphically illustrating and reinforcing the instruction described in text section 40T of instruction screen display 40-6. If the control button indicated by highlight indicia 40H of instruction screen display 40-6 were located on a machine other than the robot depicted, then it would be preferred that the graphical information 40-G display 40-6 include both a depiction of the robot and the machine (or the part of the machine) containing the control button.

Figure 5A:
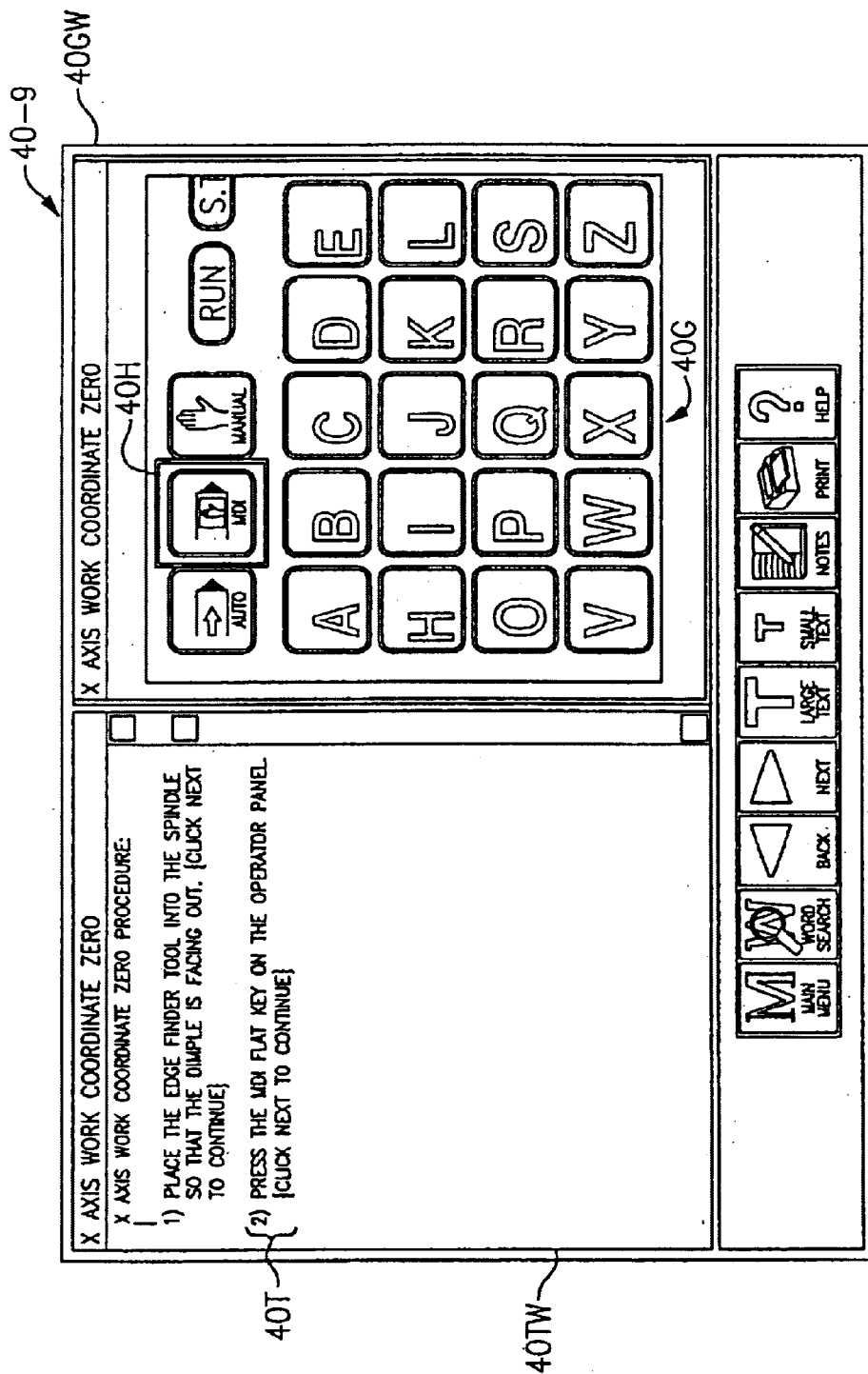
FIGS. 5A–5C illustrate instruction screen displays of an embodiment of the invention in which graphical information of a next instruction screen display illustrates a wholly different graphical image than a previous instruction screen display.
Figure 5B:
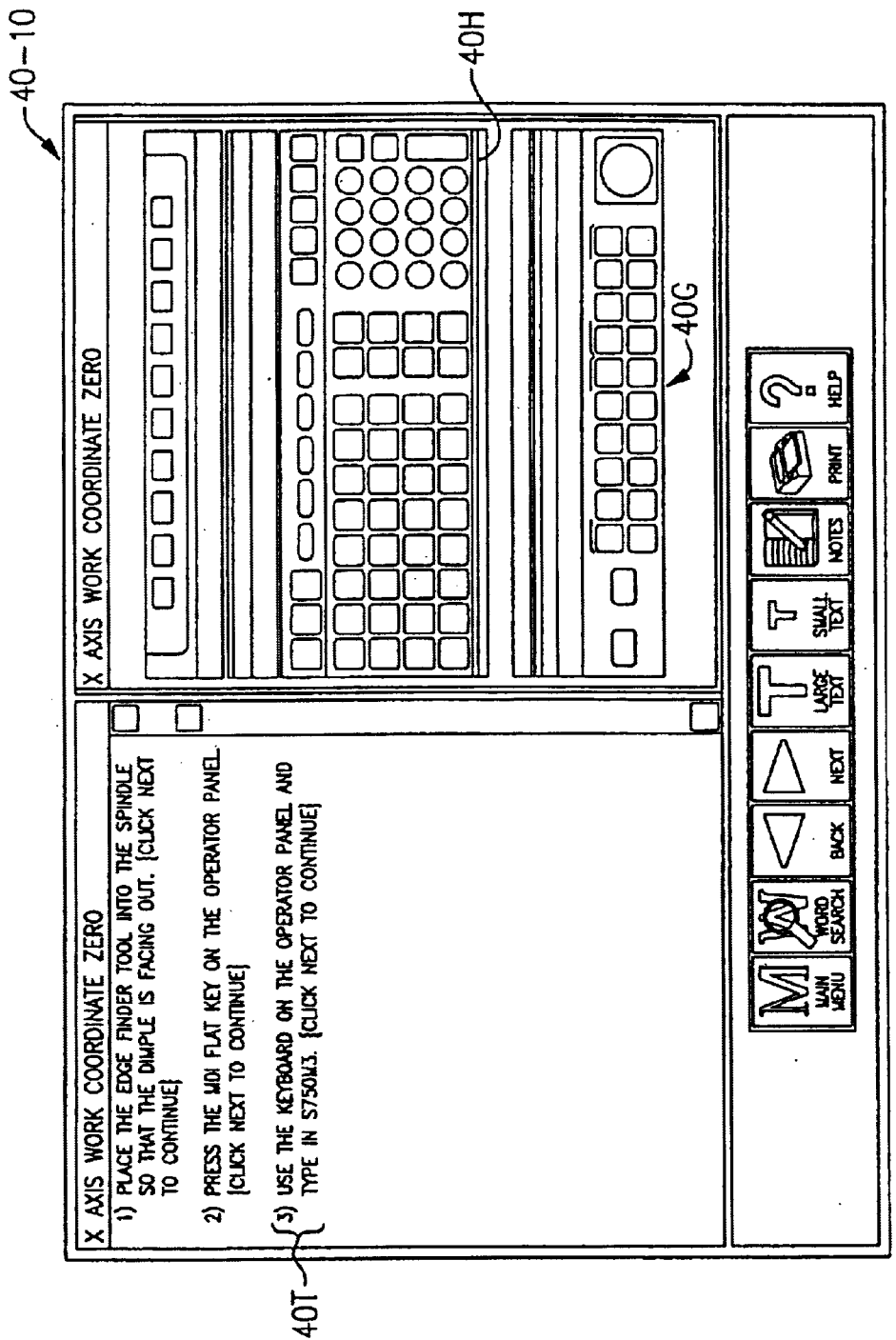
Figure 5C:
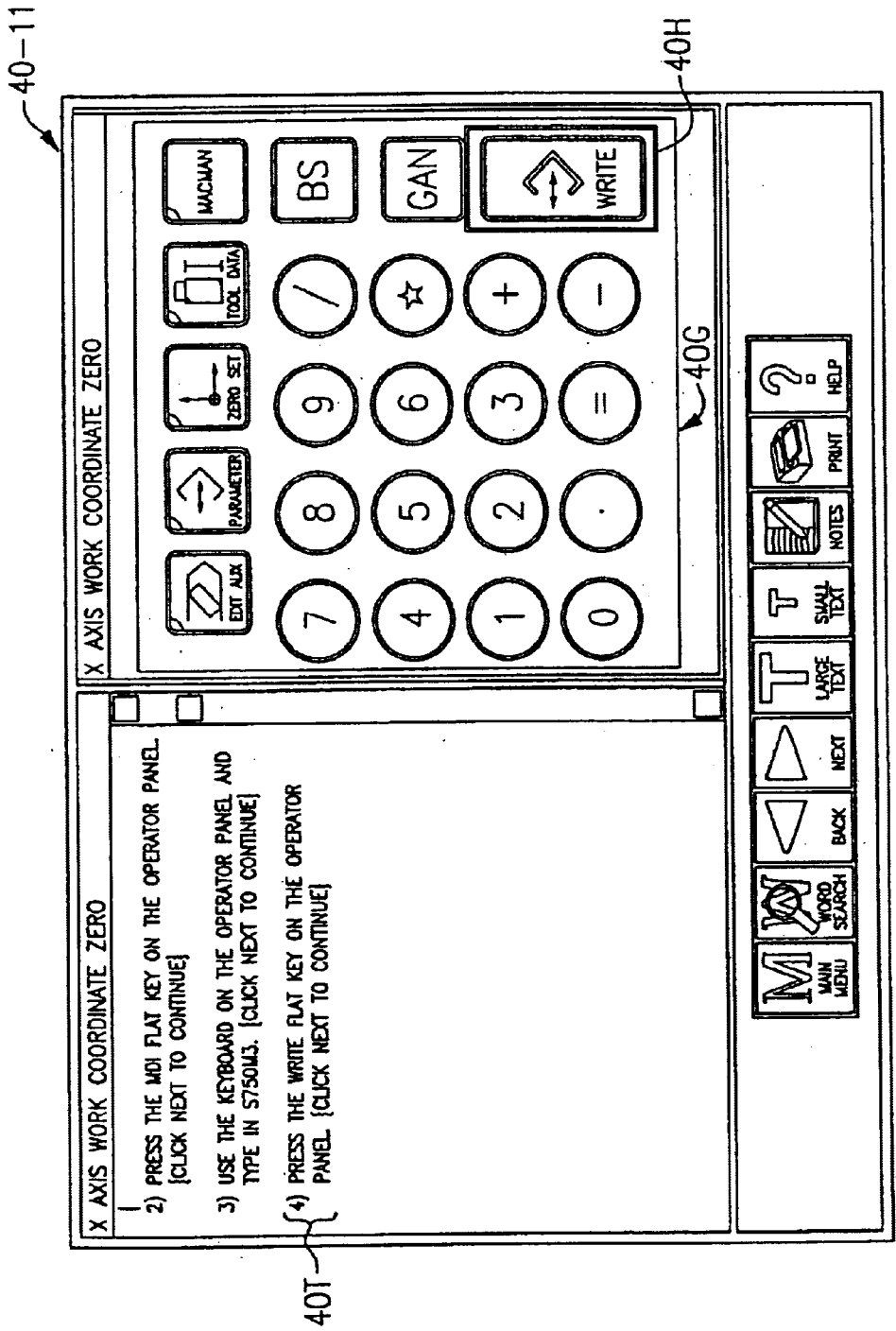
Figure 6A:
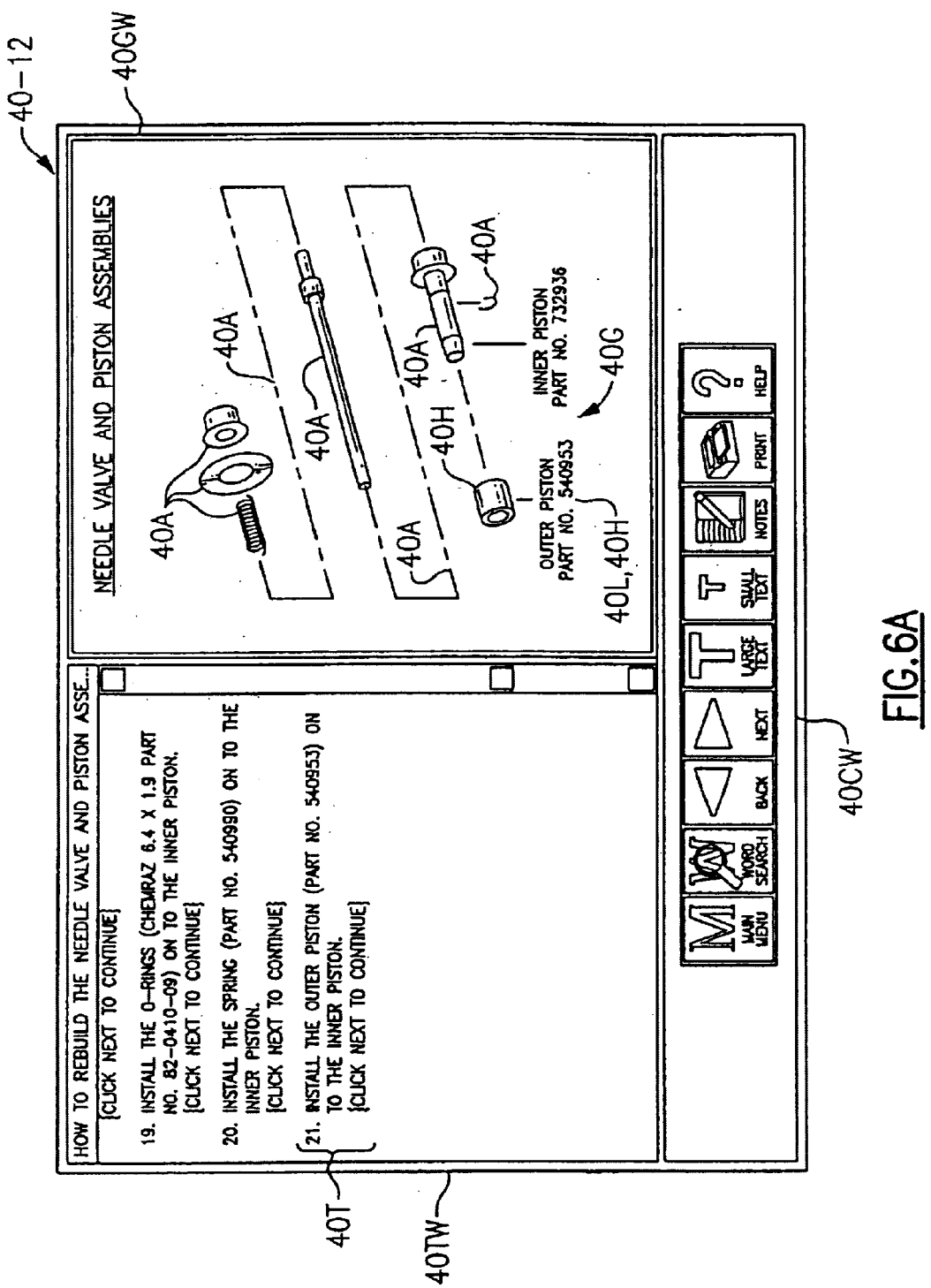
FIGS. 6A–6D illustrate instruction screen displays of an embodiment of the invention in which graphical information of the instruction screen display include assembly state indicia.
Figure 6B:
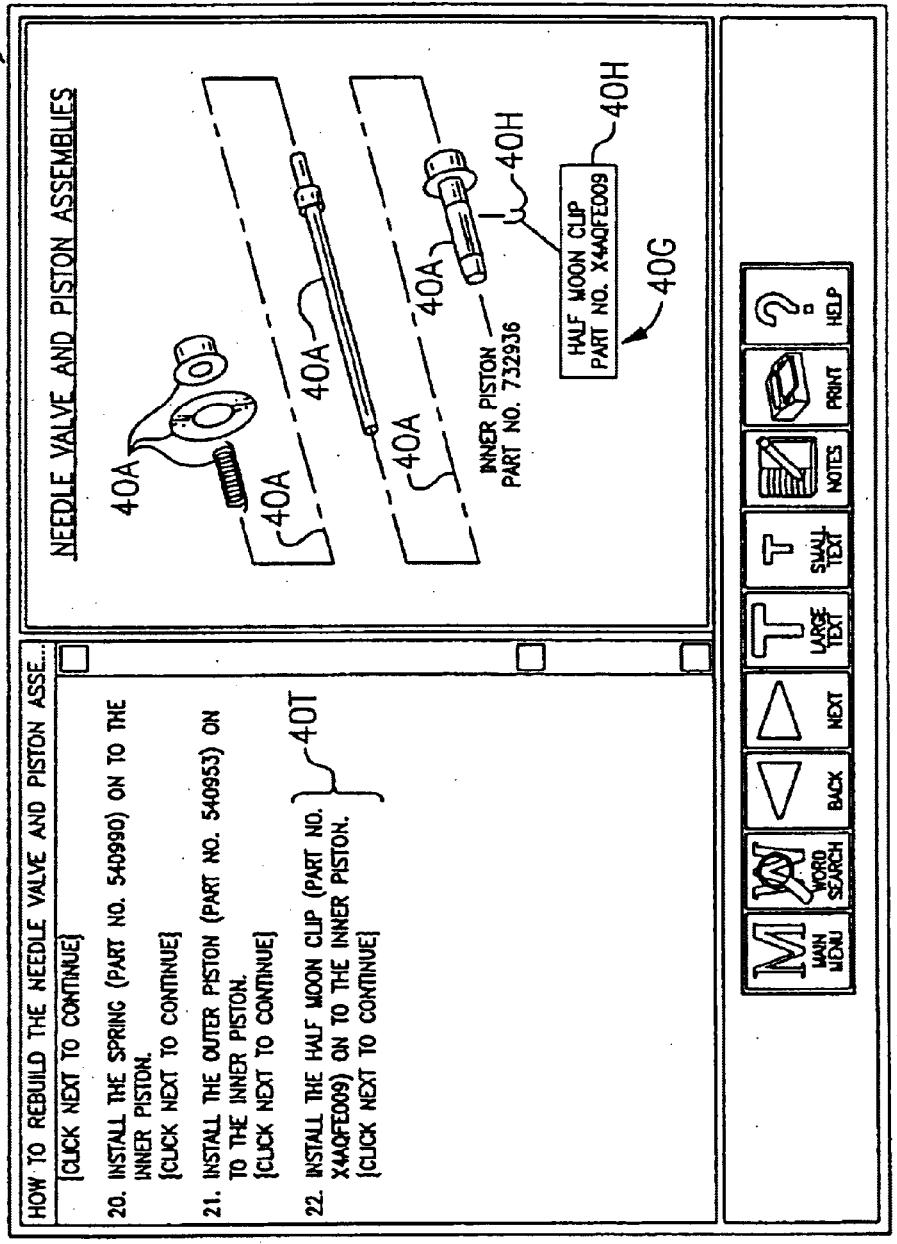
Figure 6C:
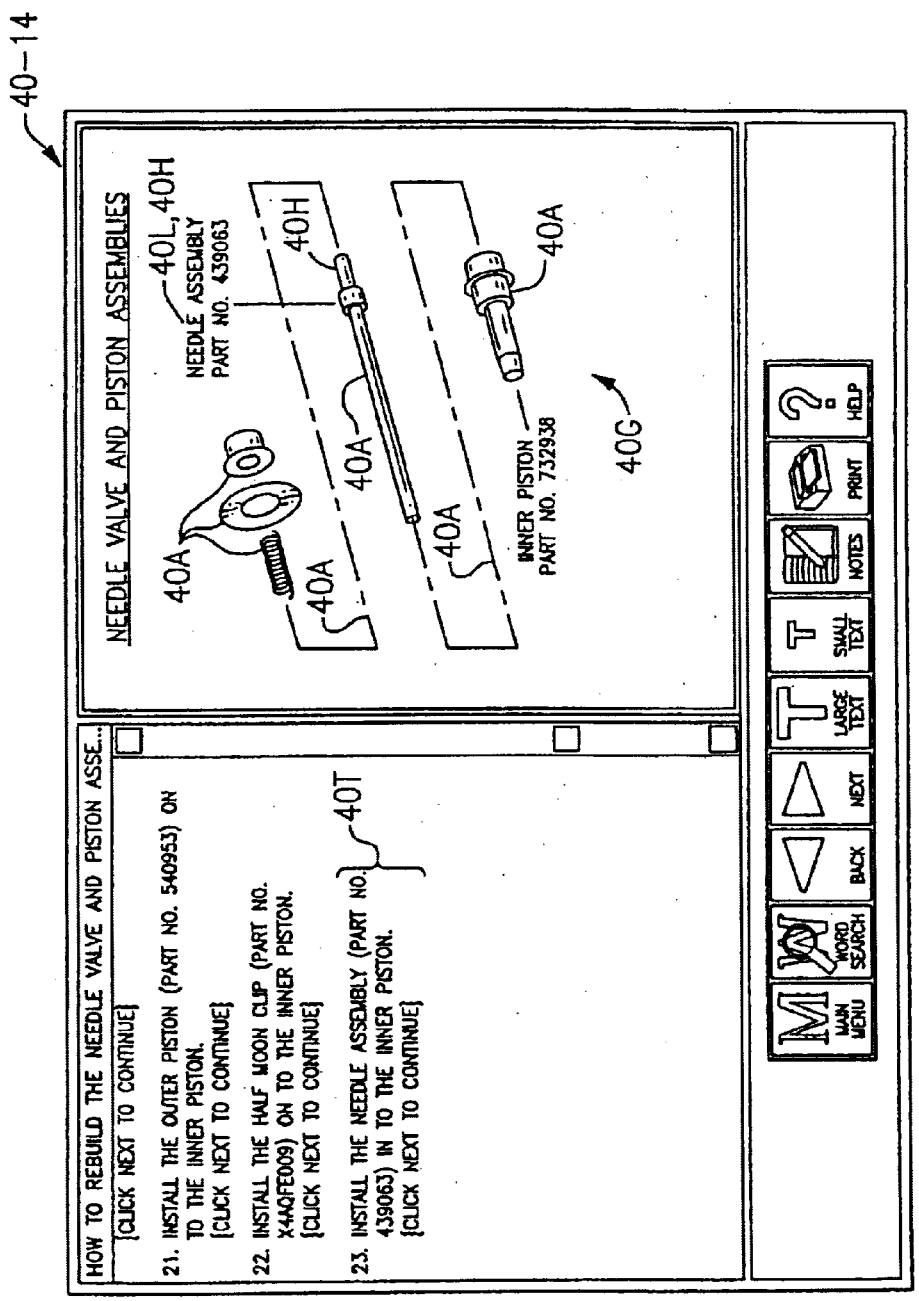
Figure 6D:
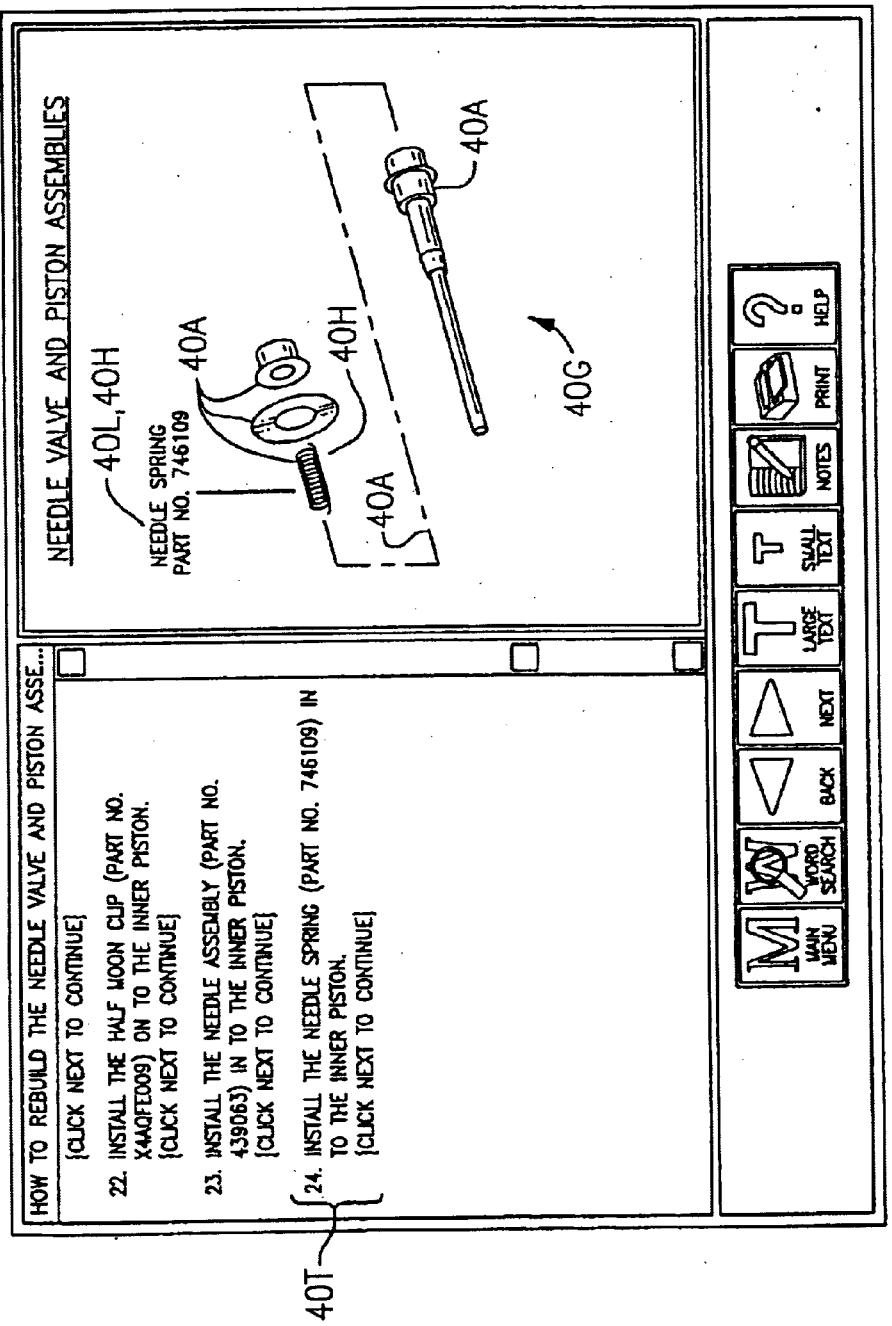

The embodiment shown in FIGS. 5A–5C illustrates that the graphical information of a next instruction screen display in accordance with the invention can be markedly different than the graphical information of a previous instruction screen display. It is seen that the graphical information of a next instruction screen display 40-10 depicts an entire operator panel having a keyboard highlighted by highlight indicia 40H while the graphical information 40G of previous instruction screen display 40-9 depicts an exploded view of a portion of the operator panel. While the graphical information 40G of displays 40-9, and 40-10 show different portions of the same machine, it will be understood that if a next instruction pertains to an operation on a machine different from a previous instruction, then the graphical information of the next machine should have a depiction of a machine different than the machine depicted in the previous instruction screen display.

The graphical information 40G of instruction screen display 40-3 described herein above includes assembly state indicia 40A for illustrating the state of disassembly of a machine. Instruction screen displays 40-12, 40-13, 40-14, 40-15 of FIGS. 6A–6D, meanwhile, show assembly state indicia illustrating the state of assembly of a machine comprising component parts that are assembled.

The series of consecutively displayed instruction screen displays 40-12, 40-13, 40-14 and 40-15 aid a user in a process involving assembly of a machine having a plurality of component parts. In general, the text section 40T of each instruction screen display described with reference to FIGS. 6A–6D describes an instruction involving the assembly of a component minor body to a component major body, while the graphical information of each instruction screen display includes a graphical depiction of the minor body and the major body. The graphical depiction of the minor body may include highlight indicia highlighting the minor body while the graphical depiction of the major body may illustrate the state of assembly of the major body after execution of the instruction described in text section of the previous instruction screen display. For example, while the text section 40T of instruction screen display 40-15 describes the assembly of a needle spring onto a major body, the graphical information 40G of display 40-15 includes highlight indicia 40H, 40L highlighting the minor body. While such highlight indicia cannot be shown in the grey scale drawings provided, the highlight indicia highlighting the minor body which is being assembled preferably includes an altered graphical display form. The component part may be highlighted by being displayed in a different color than the remaining component depictions. The graphical information 40G of instruction screen display also shows assembly state indicia 40A indicating the state of assembly of a major body in the state after execution of the instruction described in the text section of the previous instruction screen display. The graphical information 40G of instruction screen display 40-15 shows a needle assembly being inserted into an inner position as described in the text section 40T of instruction screen display 40-14.

Figure 7A:
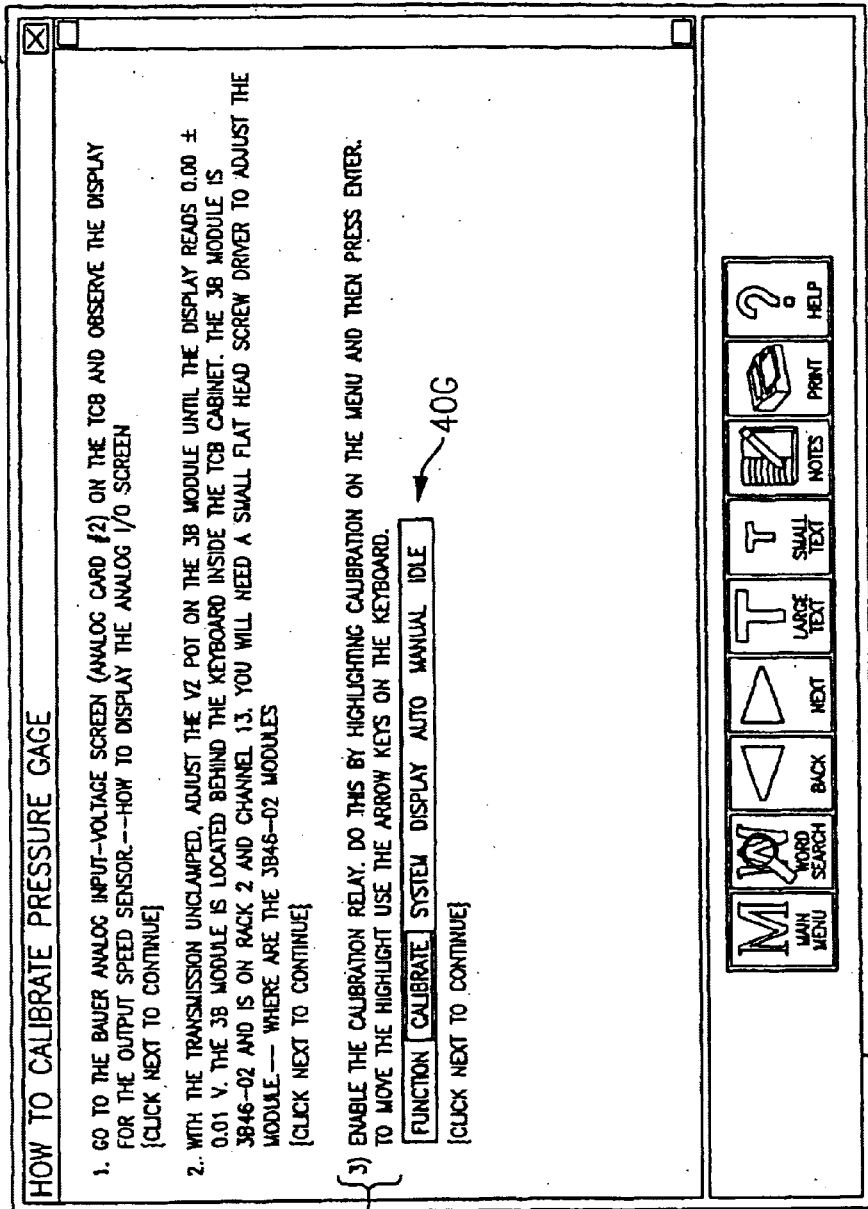
FIGS. 7A–7C illustrate instruction screen displays of an embodiment of the invention in which the invention is implemented in a two window format.
Figure 7B:
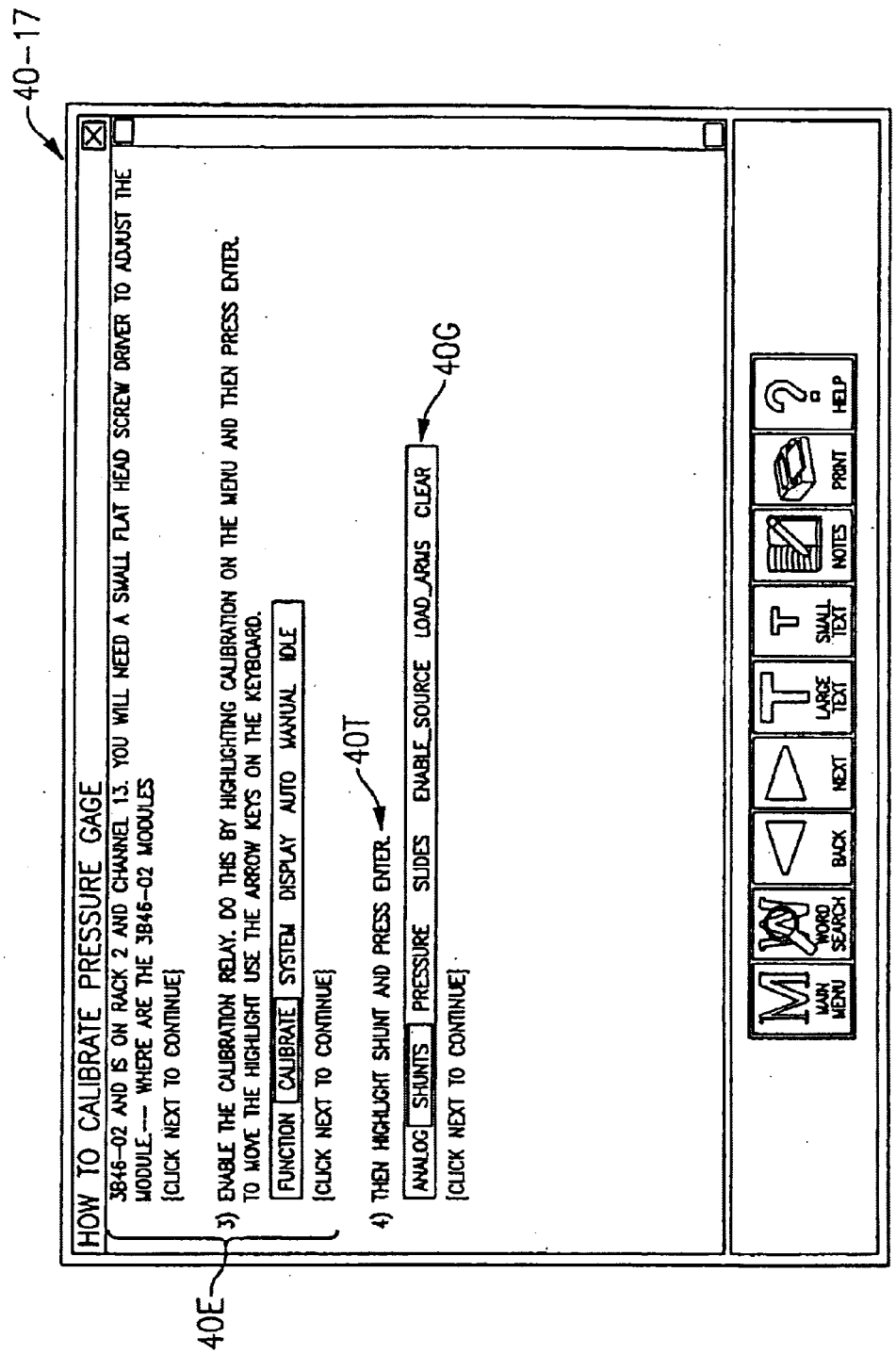
Figure 7C:
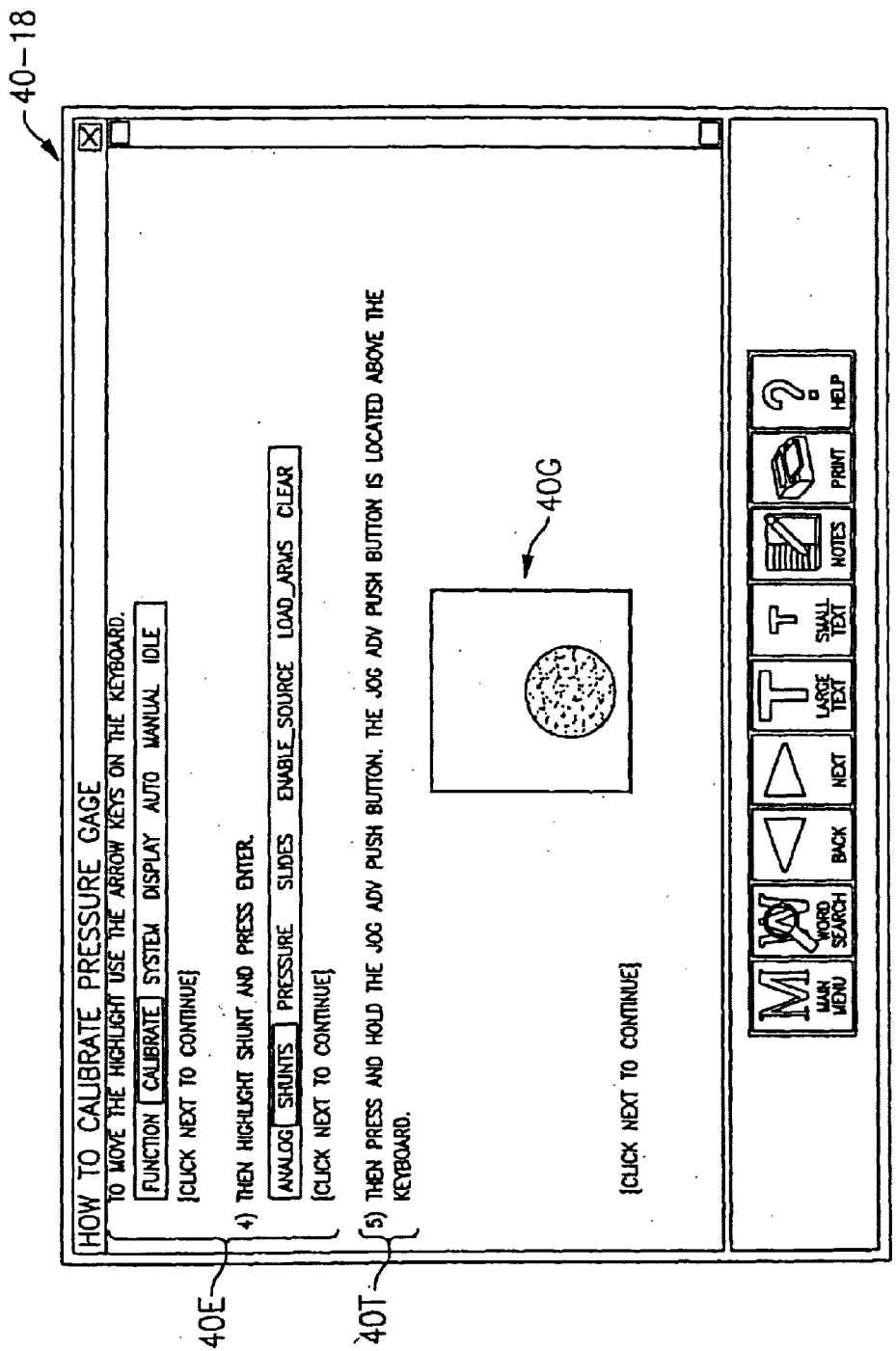

Instruction screen displays 40-16, 40-17, and 40-18 of FIGS. 7A–7C illustrate an alternate arrangement for textual and graphical information of instruction screen displays. Graphical information 40G of each instruction screen display 40-16, 40-17, 40-18 is displayed below its associated textual information 40T instead of being displayed in side-by-side arrangement with respect to the textual information. Furthermore, extraneous information 40E of instruction screen displays 40-17 and 40-18 include extraneous graphical information from previous instruction screens in addition to extraneous textual information. The graphical information 40G of instruction screen displays 40-17 and 40-18 demonstrates again that the graphical information can illustrate a different part of a machine or a different machine than that depicted in the graphical information of a previous instruction screen display. The push button depicted in the graphical information 40G of screen display 40-18 can be located on a different machine than the menu control bar depicted by the graphical information 40G of instruction screen display 40-17.

The invention described herein above may be implemented using any computer system that is configured to display, on receipt of appropriate commands, combined textual and graphical information. The combination of text and graphics on a display screen are sometimes referred to collectively as "embedded graphics." FIGS. 2A–2C illustrate a simplified embodiment of the invention which can be implemented in a computer system having basic graphical display resources without a graphical user interface and without windowing system capabilities. In the example of FIGS. 2A–2C a user may activate a control button of keyboard 16 or mouse 18 to cause display of a next instruction screen display of a series of instruction screen displays. It may be preferred to implement a simplified version of the invention in accordance with the embodiment of FIG. 2A–2C in case the invention is implemented in a processor system apparatus equipped with memory conserving operating system, which are common in some process system apparatuses, such as certain hand held portable computers.

If the invention is implemented in a process or system equipped with windowing system capabilities and a graphical user interface, it is convenient to implement the invention with use of instruction screen displays having multiple window displays and a control bar for receiving user initiated commands to change display of an apparatus to a next instruction screen display. Commonly available operating systems such as MCINTOSH available from Apple Computers, Inc., and WINDOWS available from Microsoft, Inc. have built-in graphical user interfaces and windowing systems.

The embodiments of FIGS. 3A–7C include instruction screen displays having multiple windows. A first window 40TW which can be termed a text window is arranged to display an instruction screen display's text section 40T, and a second window 40GW which can be termed a graphics window is arranged to display the graphical section of the instruction screen displays. Displaying textual and graphical information using two separate and dedicated windows enables the invention to be programmed more easily, since the programs controlling displays by text window and the graphics window can be developed and edited independently. Using dedicated text and graphics windows also allows display aspects of the text information and the graphical information of an instruction display screen to be controlled independently. It is seen, for example, that text window 40TW in the example of FIGS. 40-4 and 40-5 includes a scroll bar 40S which controls the display of text window 40TW without controlling the display of graphics window 40GW. Scroll bar 40S allows the text section 40T of the present instruction screen display to be adjusted to a desired vertical position on screen display 12 without adjusting the position of graphics section 40G on screen 12. Further, display control buttons 40CB allow one or both of the text and graphics display files to be closed down to allow access to other files available in the windowing system.

An important feature of the invention is that apparatus 10 displays a next instruction screen display substantially immediately on receipt of a user initiated command to display a next instruction screen display. Since a next instruction screen display in a series of instruction screen displays typically includes both a text element and a graphic element distinct from the most previous instruction screen display, implementing the invention using multiple windows normally requires that a text window containing text and a graphics window containing graphics are altered contemporaneously on receipt of a single next instruction screen display command. Text window 40TW and graphics window 40GW may be made to display new text and new graphics substantially contemporaneously by configuring text window 40TW to display text information of a next instruction screen display on each activation of next button, creating a specific address for the graphical information particularly associated with each instruction screen display, and establishing a link to the address information which is activated each time text information of a next instruction screen is displayed such that graphical information associated with the next instruction screen is displayed each time the next button is activated. Of course, the link could also be established so that particular text information is displayed upon certain graphical information being displayed as opposed to being made so that particular graphical information is displayed upon certain text information being displayed.

The embodiment of FIG. 3A–3B further has a control window 40CW containing a control bar 40C. Control bar 40CW contains a next screen display button 40N. A user causes display of a next instruction screen display in the embodiment of FIG. 3A–3B by mouse clicking next screen display button 40N. Where apparatus 10 includes screen displays having control bars for switching between displays, it is customary to make the apparatus responsive either to control bar initiated commands, or to commands initiated via keyboard 16 (normally an arrow key thereof) to provide display of a next instruction screen display. Control bar 40C, in addition to having a next screen button 40N may include such other buttons as a main menu button 40M allowing access to alternative sequences of instruction screen displays, text size control buttons 40TX, a print button 40P, a help button 40H, and a previous screen 40P button which when actuated causes apparatus 10 to display the most previous instruction screen display. The invention can also be made using two windows in which a first window 40TGW contains embedded text and graphics and a second window 40CW contains a control bar. Such an embodiment is illustrated in FIGS. 7A–7C.

An embodiment of the invention having a multiple window display format and graphical user interface may be implemented with use of any one of an available author tool type software packages facilitating the development of and combined display of multiple windows which may contain either or both text and graphics. Examples of author tool type programs which may be used in the development of embodiments of the invention include VISUAL BASIC available from Microsoft, Inc., VISUAL C++ available from Microsoft, Inc.,and GUIDE AUTHOR, available from Infoaccess, Inc.

Although existing internet software does not yet support a multiple window format as shown by the embodiments of FIGS. 3A–7C, an internet embodiment of the invention could readily be made using existing internet software by establishing a website that makes a sequence of windowless embedded graphic screen displays (such as displays in accordance with screen displays 40-1, 40-2, 40-3) available to an internet user.

Such a website may be made so that one instruction screen display at a time is transmitted to a screen buffer memory of a user computer system terminal on receipt of a command to display a next instruction screen display. In the alternative, the website may be configured so that multiple instruction screen displays are transmitted to a user terminal memory location at once which are then displayed in sequence in response to user initiated next instruction screen command by reading of the instruction screen displays from the user terminal memory location in which the multiple screens are stored. The latter method minimizes the delay between the time a next instruction screen command is received and a next instruction screen display is shown, but may be unnecessary as internet data rates improve.

These and other features of the invention will become clear to those skilled in the art from a careful reading of the Detailed Description of the Preferred Embodiments in connection with the referenced drawings.

What is claimed is:

1. An instruction presentation apparatus for presenting instructional information to a user of at least one machine, said apparatus comprising:

a display;

a processor system for controlling display of text and graphical information on said display, said computer system being adapted to receive a user-initiated command causing change in an output by said display;

a first instruction screen display for display by said display comprising simultaneously displayed text and correlated graphical information, said text information of said first instruction screen display including text describing a first act to be performed on said machine, said correlated graphical information including at least a graphical depiction of said machine; and a second instruction screen display for display by said display also comprising simultaneously displayed text and correlated graphical information, said text information of said second instruction screen display describing a second act to be performed on said machine, wherein text of said second instruction screen display includes at least one distinguishing feature relative to text of said first instruction screen display, said correlated graphical information of said second instruction screen display including a graphical depiction of said machine, wherein graphics of said second instruction screen display include at least one distinguishing feature relative to graphics of said first instruction screen display, wherein said text information of said first instruction screen display and said second instruction screen display describe successive steps of a process to be performed relative to said machine wherein said processor system changes an output of said display from said first instruction screen display to said second instruction screen display in response to receipt by said at least one processor system of a command to change an output of said display from said first instruction screen display to said second instruction screen display, and wherein said graphical information of at least one of said instruction screen displays includes a highlight indicia indicating an area on said machine to be acted on during execution of an act described in said text information associated with said graphical information of said at least one of said instruction screen displays, and wherein said highlight indicia is selected from the group consisting of a specific area of a machine depiction being displayed in a flashing graphic, a specific area of said machine depiction being displayed in a different color than other areas of said machine depiction and a specific area of said machine depiction being displayed in a different grey scale than other areas of said machine depiction.

2. The apparatus of claim 1, wherein said highlight indicia includes a specific area of said graphical machine depiction being displayed in a flashing graphics mode.

3. The apparatus of claim 1, wherein said highlight indicia includes a specific area of said graphical machine depiction being displayed in a different color or grey scale from other areas of said machine depiction.

4. The apparatus of claim 1, wherein said graphical information of either of said first or second instruction screen displays includes assembly state indicia illustrating said machine in a partially assembled or partially disassembled state.

5. The apparatus of claim 1, wherein said graphical information either of said instruction screen displays includes movement indicia indicating a direction in which a tool is to be moved.

6. The apparatus of claim 1, wherein said graphical information of either of said instruction screen displays includes motion indicia indicating motion of a machine or machine part from a first location to a second location.

7. The apparatus of claim 1, wherein said graphical information section of said second instruction display includes assembly state indicia illustrating the state of assembly or disassembly of said machine resulting from an act described in said text information of said first instruction screen display.

8. The apparatus of claim 1, wherein said graphical information of said first instruction display and said second instruction screen display highlight successive steps of a process relative to said at least one machine.

9. The apparatus of claim 1, wherein said at least one processor system includes windowing system capabilities, and wherein said at least one of either of said text or graphical information of said either of said first or second instruction screen displays is presented in a window adapted to present either dedicated text or dedicated graphical information.

10. The apparatus of claim 1, wherein said processor system includes windowing system capabilities, wherein said text information of each of said first and second instruction screen displays is displayed in a text window, and wherein said graphical information of said each first and second instruction screen displays is displayed in a dedicated graphics window.

11. The apparatus of claim 1, wherein said at least one processor system includes a graphical user interface, wherein said at least one of said first or second instruction seen displays includes a control bar, and wherein said processor system receives said command to change an output of said display via said control bar.

12. The apparatus of claim 1, wherein said apparatus includes a control interface for receiving said command to change an output of said display.

13. The apparatus of claim 12, wherein an output of said display changes to a next instruction screen display upon a single actuation of said control interface by a user.

14. The apparatus of claim 12, wherein said control interface is a key of a keyboard.

15. The apparatus of claim 12, wherein said control interface is a displayed control button displayed on said display.

16. The apparatus of claim 12, wherein said control interface is labeled with indicia comprising at least one of an arrow or the word "NEXT."

17. The apparatus of claim 1, wherein said apparatus further includes a "previous instruction screen display" control interface, and wherein said apparatus is adapted to display a previous instruction screen display on said display when said "previous instruction screen display" control interface is actuated by a user.

18. The apparatus of claim 1, wherein said text information of said each first and second instruction screen displays is a bottommost displayed text of said each first and second instruction screen displays that describes an act of a process relative to said at least one machine.

19. The apparatus of claim 1, wherein said text information of said first and second instruction screen displays are designated by consecutive sequence-position indicating characters.

20. The apparatus of claim 19, wherein said text information of said each first and second instruction screen displays is a bottommost displayed text of said each first and second instruction screen displays that is designated with a sequence-position indicating character.

21. The apparatus of claim 1, wherein text of said first instruction screen display is devoid of text describing said second act.

22. An instruction presentation apparatus for presenting instructional information to a user of at least one machine, said apparatus comprising:
  a display;
  a processor system for controlling display of text and graphical information on said display, said computer system being adapted to receive a user-initiated command causing change in an output by said display;
  a first instruction screen display for display by said display comprising simultaneously displayed text and correlated graphical information, said text information of said first instruction screen display including text describing a first act to be performed on said machine, said correlated graphical information including at least a graphical depiction of said machine; and
  a second instruction screen display for display by said display also comprising simultaneously displayed text and correlated graphical information, said text information of said second instruction screen display describing a second act to be performed on said machine, wherein text of said second instruction screen display includes at least one distinguishing feature relative to text of said first instruction screen display, said correlated graphical information of said second instruction screen display including a graphical depiction of said machine, wherein graphics of said second instruction screen display include at least one distinguishing feature relative to graphics of said first instruction screen display, wherein said text information of said first instruction screen display and said second instruction screen display describe successive steps of a process to be performed relative to said machine;
  wherein said processor system changes an output of said display from said first instruction screen display to said second instruction screen display in response to receipt by said at least one processor system of a command to change an output of said display from said first instruction screen display to said second instruction screen display, and wherein said graphical information of at least one of said first and second instruction screen displays includes at least one of a movement indicia indicating a direction in which a tool is to be moved and motion indicia indicating motion of a machine or machine part from a first location to a second location.

23. The apparatus of claim 22, wherein said graphical information of at least one of said instruction screen displays includes a highlight indicia indicting an area on said machine to be acted on during execution of an act described in said text information associated with said graphical information of said at least one of said instruction screen displays.

24. The apparatus of claim 23, wherein said highlight indicia includes an arrow graphic pointing to a specific area of said graphical machine depiction of said graphical information.

25. The apparatus of claim 23, wherein said highlight indicia includes a border outlining a specific area of said graphical machine depiction.

26. The apparatus of claim 23, wherein said highlight indicia includes a specific area of said graphical machine depiction being displayed in a flashing graphics mode.

27. The apparatus of claim 23, wherein said highlight indicia includes a specific area of said graphical machine depiction being displayed in a different color or grey scale from other areas of said machine depiction.

28. The apparatus of claim 23, wherein said highlight indicia includes label indicia indicating an identification of a part or area of said machine depiction.

29. The apparatus of claim 23, wherein said highlight indicia includes a depiction of a specific tool type and its application at a specific location of said graphical machine depiction of said graphical information.

30. The apparatus of claim 29, wherein said highlight indicia further includes label indicia indicating an identification of said tool.

31. The apparatus of claim 22, wherein said graphical information of either of said first or second instruction screen displays includes assembly state indicia illustrating said machine in a partially assembled or partially disassembled state.

32. The apparatus of claim 22, wherein said graphical information of either of said instruction screen displays includes movement indicia indicating a direction in which a tool is to be moved.

33. The apparatus of claim 22, when said graphical information of either of said instruction screen displays includes motion indicia indicating motion of a machine or machine part from a first location to a second location.

34. The apparatus of claim 22, wherein said graphical information section of said second instruction display includes assembly state indicia illustrating the state of assembly or disassembly of said machine resulting from an act described in said text information of said first instruction screen display.

35. The apparatus of claim 22, wherein said graphical information of said first instruction display and said second instruction screens display highlight successive steps of a process relative to said at least one machine.

36. The apparatus of claim 22, wherein said at least one processor system includes windowing system capabilities, and wherein said at least one of either of said text or graphical information of said either of said first or second instruction screen displays is presented in a window adapted to present either dedicated text or dedicated graphical information.

37. The apparatus of claim 22, wherein said processor system includes windowing system capabilities, wherein said text information of each of said first and second instruction screen displays is displayed in a text window, and wherein said graphical information of said each first and second instruction screen displays is displayed in a dedicated graphics window.

38. The apparatus of claim 22, wherein said at least one processor system includes a graphical user interface, wherein said at least one of said first or second instruction screen displays includes a control bar, and wherein said processor system receives said command to change an output of said display via said control bar.

39. The apparatus of claim 22, wherein said apparatus includes a control interface for receiving said command to change an output of said display.

40. The apparatus of claim 39, wherein an output of said display changes to a next instruction screen display upon a single actuation of said control interface. by a user.

41. The apparatus of claim 39, wherein said control interface is a key of a keyboard.

42. The apparatus of claim 39, wherein said control interface is a displayed control button displayed on said display.

43. The apparatus of claim 390, wherein said control interface is labeled with indicia comprising at least one of an arrow or the word "NEXT."

44. The apparatus of claim 22, wherein said apparatus further includes a "previous instruction screen display" control interface, and wherein said apparatus is adapted to display a previous instruction screen display on said display when said "previous instruction screen display" control interface is actuated by a user.

45. The apparatus of claim 22, wherein said text information of said each first and second instruction screen displays is a bottommost displayed text of said each first and second instruction screen displays that describes an act of a process relative to said at least one machine.

46. The apparatus of claim 22, wherein said text information of said first and second instruction screen displays are designated by consecutive sequence-position indicating characters.

47. The apparatus of claim 46, wherein said text information of said each first and second instruction screen displays is a bottommost displayed text of said each first and second instruction screen displays that is designated with a sequence-position indicating character.

48. The apparatus of claim 22, wherein text of said first instruction screen display is devoid of text describing said second act.

49. An instruction presentation apparatus for presenting instructional information to a user of at least one machine, said apparatus comprising:

a display;

a control interface;

a processor system for controlling display of text and graphical information on said display, said processor system being adapted to receive a user-initiated command entered via said control interface causing change in an output by said display;

a first instruction screen display for display by said display comprising simultaneously displayed text and correlated graphical information, said text information of said first instruction screen display describing a first act to be performed on said at least one machine, said correlated graphical information of said first instruction screen display graphically illustrating an aspect of said first act; and a second instruction screen display for display by said display screen also comprising simultaneously displayed text and correlated graphical information, said text information of said second instruction screen display describing a second act to be performed on said at least one machine wherein text of said second instruction screen display includes at least one distinguishing feature relative to text of said first instruction screen display, said correlated graphical information of said second instruction screen display graphically illustrating an aspect of said second act, wherein graphics of said second instruction screen display including at least one distinguishing feature from graphics of said first instruction screen display;

wherein said processor system changes an output of said display from said first instruction screen display to said second instruction screen display in response to an actuation of said control interface, and wherein said graphical information of at least one of said first and second instruction screen displays includes at least one of a movement indicia indicating a direction in which a tool is to be moved and motion indicia indicating motion of a machine or machine part from a first location to a second location.

50. The apparatus of claim 49, wherein said graphical information of at least one of said instruction screen displays includes a graphical depiction of said at least one machine and highlight indicia indicating an area on said at least one machine to be acted on during execution of an act described in said text information associated with said graphical information of said at least one of said instruction screen displays.

51. The apparatus of claim 50, wherein said highlight indicia includes an arrow graphic pointing to a specific area of said graphical machine depiction of said graphical information.

52. The apparatus of claim 50, wherein said highlight indicia includes a border outlining a specific area of said graphical machine depiction.

53. The apparatus of claim 50, wherein said highlight indicia includes specific area of said graphical machine depiction being displayed in a flashing graphics mode.

54. The apparatus of claim 50, wherein said highlight indicia includes a specific area of said graphical machine depiction being displayed in a different color or grey scale from other areas of said machine depiction.

55. The apparatus of claim 50, wherein said highlight indicia includes label indicia indicating an identification of a part or area of said machine depiction.

56. The apparatus of claim 50, wherein said highlight indicia includes a depiction of a specific tool type and its application at a specific location of said graphical machine depiction of said graphical information.

57. The apparatus of claim 56, wherein said highlight indicia further includes label indicia indicating an identification of said tool.

58. The apparatus of claim 49, wherein said graphical information of either of said first or second instruction screen displays includes assembly state indicia illustrating said at least one machine in a partially assembled or partially disassembled state.

59. The apparatus of claim 49, wherein said graphical indicia of either of said instruction Screen displays includes movement indicia indicating a direction in which a tool is to be moved.

60. The apparatus of claim 49, wherein said graphical indicia of either of said instruction screen displays includes motion indicia indicating motion of a machine or machine part from a first location to a second location.

61. The apparatus of claim 49, wherein said graphical information of said second instruction display includes assembly state indicia illustrating the state of assembly or disassembly of said machine resulting from an act described in said text section of said first instruction screen display.

62. The apparatus of claim 49, wherein text of said second instruction screen display differs from text of said first instruction screen display essentially only in that text of said second instruction display screen includes text corresponding to said text information of said second instruction screen display.

63. The apparatus of claim 49, wherein said processor system includes windowing system, capabilities, and wherein said at least one of either of said text or graphical information of said either of said first or second instruction screen displays, is presented in a window adapted to present either dedicated text or dedicated graphical information.

64. The apparatus of claim 49, wherein said processor system includes windowing system capabilities, wherein said text information of each of said first and second instruction screen displays is displayed in a text window, and wherein said graphical information of said each first and second instruction screen displays is displayed in a dedicated graphics window.

65. The apparatus of claim 49, wherein said processor system includes a graphical user interface, wherein said at least one of said first or second instruction screen displays includes a control bar, and wherein said processor system receives user-initiated change screen command via said control bar.

66. The apparatus of claim 49, wherein an output of said display changes to a next instruction screen display upon a single actuation of said control interface by a user.

67. The apparatus of claim 49, wherein said control interface is a key of a keyboard.

68. The apparatus of claim 49, wherein said control interface is a displayed control button displayed on said display.

69. The apparatus of claim 49, wherein said apparatus further includes a "previous instruction screen display" control interface, and wherein said apparatus is adapted to display a previous instruction screen display on said display when said "previous instruction screen display" control interface is actuated by a user.

70. The apparatus of claim 49, wherein said text information of said each first and second instruction screen displays is a bottommost displayed text of said first and second instruction screen displays that describes an act of a process relative to said at least one machine.

71. The apparatus of claim 49, wherein said text information of said each first and second instruction screen displays is designated by consecutive sequence-position indicating characters.

72. The apparatus of claim 71, wherein said text information of said each first and second instruction screen displays is a bottommost displayed text of said each first and second instruction screen displays that is designated with a sequence-position indicating character.

73. The apparatus of claim 49, wherein text of said first instruction screen display is devoid of text describing said second act.

74. The apparatus of claim 49, wherein said text information of said first and second instruction screen displays describe successive steps of a process to be carried out relative to said machine.

75. An instruction presentation apparatus for presenting instructional information relating to a process to be performed relative to at least one machine, said apparatus comprising:

a display;

a processor system for controlling display of text and graphical information on said display, said processor system being adapted to receive a user-initiated command to cause change in an output by said display;

a first instruction screen display for display by said display comprising simultaneously displayed text and correlated graphical information, said text information of said first instruction screen display describing a first act to be performed on said at least one machine, said correlated graphical information of said first instruction screen display graphically illustrating an aspect of said first act;

a second instruction screen display for display by said display also comprising simultaneously displayed text and correlated graphical information, said text information of said second instruction screen display describing a second act to be performed on said at least one machine, said correlated graphical information of said second instruction screen display graphically illustrating an aspect of said second act, said graphical information of said second instruction screen display including at least one distinguishing feature from said graphical information of said first instruction screen display;

a third instruction screen display for display by said display screen also comprising simultaneously displayed text and correlated graphical information, said text information of said third instruction screen display describing a third act to be performed on said at least one machine, said correlated graphical information of said third instruction screen display graphically illustrating an aspect of said third act, said graphical information of said third instruction screen display including at least one distinguishing feature from said graphical information of said second instruction screen display;

wherein said processor system changes an output of said display from said first instruction screen display to said second instruction screen display in response to receipt by said processor system of a first command to change an output of said display, and wherein said processor system changes on output of said display from said second instruction screen display to said third instruction screen display in response to receipt by said processor system of a second command to change an output of said display, and wherein said graphical information of at least one of said first, second, and third instruction screen displays includes at least one of a movement indicia indicating a direction in which a tool is to be moved and motion indicia indicating motion of a machine or machine part from a first location to a second location.

76. The apparatus of claim 75, wherein said graphical information of at least one of said instruction screen displays includes a graphical depiction of said at least one machine and highlight indicia indicating an area on said at least one machine to be acted on during execution of an act described in said text information associated with said graphical information of said at least one of said instruction screen displays.

77. The apparatus of claim 76, wherein said highlight indicia includes an arrow graphic pointing to a specific area of said graphical machine depiction of said graphical information.

78. The apparatus of claim 76, wherein said highlight indicia includes a border outlining a specific area of said graphical machine depiction.

79. The apparatus of claim 76, wherein said highlight indicia includes a specific area of said graphical machine depiction being displayed in a flashing graphics mode.

80. The apparatus of claim 76, wherein said highlight indicia includes a specific area of said graphical machine depiction being displayed in a different color or grey scale from other areas of said machine depiction.

81. The apparatus of claim 76, wherein said highlight indicia includes label indicia indicating an identification of a part or area of said machine depiction.

82. The apparatus of claim 76, wherein said highlight indicia includes a depiction of a specific tool type and its application at a specific location of said graphical machine depiction of said graphical information.

83. The apparatus of claim 76, wherein said highlight indicia further includes label indicia indicating an identification of said tool.

84. The apparatus of claim 75, wherein said graphical information of at least one of said instruction screen displays includes assembly state indicia illustrating said at least one machine in a partially assembled or partially disassembled state.

85. The apparatus of claim 75, wherein said graphical indicia of one of said instruction screen displays includes movement indicia indicating a direction in which a tool is to be moved.

86. The apparatus of claim 75, wherein said graphical indicia of one of said instruction screen displays includes motion indicia indicating motion of a machine or machine part from a first location to a second location.

87. The apparatus of claim 75, wherein said graphical information of one of said instruction display includes assembly state indicia illustrating the state of assembly or disassembly of said machine resulting from an act described in said text section of an immediately previous instruction screen display.

88. The apparatus of claim 75, wherein both text and graphics of said second instruction screen display includes at least one distinguishing feature relative to text and graphics of said first instruction screen display.

89. The apparatus of claim 75, wherein said apparatus includes a control interface for receiving said user-initiated command to change an output of said display.

90. The apparatus of claim 75, wherein an output of said display changes to a next instruction screen display upon a single actuation of said user interface by a user.

91. The apparatus of claim 89, wherein said control interface is a key of a keyboard.

92. The apparatus of claim 89, wherein said control interface is a displayed control button displayed on said display.

93. The apparatus of claim 89, wherein said control interface is labeled with indicia comprising at least one of an arrow or the word "NEXT."

94. The apparatus of claim 75, wherein said text information of said each first and second instruction screen displays is designated by consecutive sequence-position indicating characters.

95. The apparatus of claim 94, wherein said text information of said each first and second instruction screen displays is a bottommost displayed text of said first and second instruction screen displays that is designated with a sequence-position indicating character.

96. The apparatus of claim 75, wherein text of said first instruction screen display is devoid of text describing said second act.

97. The apparatus of claim 75, wherein said text information of said first and second instruction screen displays describe successive steps of a process to be carried out relative to said machine.

98. A method for performing work relating to a machine, said method comprising the steps of:
    providing a computer having a display and a user interface;
    programming said computer with a program enabling said computer to display first and second of instruction screen displays, each of said first and second instruction screen display including a text section describing an instruction and a graphic section, graphically reinforcing said instruction, said text section of said first instruction screen describing a first act, said text section of said second instruction screen display describing said second act, and wherein said graphical section of at least one of said first and second instruction screen displays includes at least one of a movement indicia indicating a direction in which a tool is to be moved and motion indicia indicating motion of a machine or machine part from a first location to a second location, said program further enabling said computer to change an instruction screen being displayed upon the actuation of said user interface;
    running said program to display said first instruction screen display;
    executing an instruction in accordance with said first instruction screen display;
    actuating said user interface to display a second instruction screen display; and
    executing an instruction in accordance with said second instruction screen display wherein text of said first instruction screen display is devoid of text describing said second act.

99. The method of claim 98, wherein said program enables said computer to display at least two instruction screen displays each having a distinct text and a distinct graphic.

100. The method of claim 98, further comprising the step of actuating said control to display a third instruction screen display; and
    executing an instruction in accordance with said third instruction screen display;
    wherein said program enables said computer to display at least three instruction screen displays, each having distinct text and graphics.

101. The method of claim 98, wherein said graphic section of at least one of said instruction screen displays includes highlight indicia indicating an area on said machine to be acted on during execution of an act described in said text information associated with said graphic of said at least one of said instruction screen displays.

102. The method of claim 101, wherein said highlight indicia includes an arrow graphic pointing to a specific area of said graphical machine depiction of said graphic.

103. The method of claim 101, wherein said highlight indicia includes a border outlining a specific area of said graphical machine depiction.

104. The method of claim 101, wherein said highlight indicia includes a specific area of said graphical machine depiction being displayed in a flashing graphics mode.

105. The method of claim 101, wherein said highlight indicia includes a specific area of said graphical machine depiction being displayed in a different color or grey scale from other areas of said machine depiction.

106. The method of claim 101, wherein said highlight indicia includes a label indicia indicating an identification of a part or area of said machine depiction.

107. The method of claim 101, wherein said highlight indicia includes a depiction of a specific tool type and its application at a specific location of said graphical machine depiction of said graphic.

108. The method of claim 107, wherein said highlight indicia further includes label indicia indicating an identification of said tool.

109. The method of claim 98, wherein said graphic section of each of said first and second instruction screen displays includes assembly state indicia illustrating said machine in a partially assembled or partially disassembled state.

110. The method of claim 98, wherein said graphic section of at least one of said instruction screen displays includes movement indicia indicating a direction in which a tool is to be moved.

111. The method of claim 98, wherein said graphic section of at least one of said instruction screen displays includes motion indicia indicating motion of a machine or machine part from a first location to a second location.

112. The method of claim 98, wherein said graphic section of said second instruction display includes assembly state indicia illustrating the state of assembly or disassembly of said machine resulting from an act described in said text section of said first instruction screen display.

113. The method of claim 98, wherein said text section of said second instruction display includes at least one distinguishing feature from said text of said first instruction screen display.

114. The method of claim 98, wherein said programming steps include the step of programming said computer to include windowing system capabilities, and wherein said at least one of either of said text or graphic section of said either of said first or second instruction screen displays is presented in a window adapted to present either dedicated text or dedicated graphic information.

115. The method of claim 98, wherein said programming step includes the step of configuring said computer to include windowing system capabilities, wherein said text of each of said first and second instruction screen displays is displayed in a dedicated text window, and wherein said graphic of said each first and second instruction screen displays is displayed in a dedicated graphics window.

116. The method of claim 98, wherein said programming step includes the step of configuring said computer to include a graphical user interface, wherein said at least one of said first or second instruction screen displays includes a control bar, and wherein said user-interface is provided by said control bar.

117. The method of claim 98, wherein said programming step further includes the step of programming said computer so that an output of said display changes to a next instruction screen display upon a single actuation of said user interface by a user.

118. The method of claim 98, wherein said programming step further includes the step of programming said computer so that an output of said display changes to a next instruction screen display upon a single actuation of said user interface by a user.

119. The method of claim 98, wherein said programming step further includes the step of programming said computer so that said control interface is a key of a keyboard.

120. The method of claim 98, wherein said programming step flier includes the step of programming said computer so that said control interface is a displayed control button displayed on said display.

121. The method of claim 98, wherein said programming step further includes the step of programming said computer so that said control interface is labeled with indicia comprising one of an arrow or the word "NEXT."

122. The method of claim 98, wherein said programming step further includes the step of programming said computer so that said computer further includes a "previous instruction screen display" control interface, and wherein said computer is adapted to display a previous instruction screen display on said display when said "previous instruction screen display" control interface is actuated by a user.

123. The method of claim 98, wherein said programming step further includes the step of programming said computer so that said text sections of said each first and second instruction screen displays is a bottommost displayed text of said each first and second instruction screen displays that describes an act of a process relative to said at least one machine.

124. The method of claim 98, wherein said programming step further includes the step of programming said computer so that said text sections of said each first and second instruction screen displays are designated by consecutive sequence-position indicating characters.

125. The method of claim 124, wherein said programming step further includes the step of programming said computer so that said text section of said each first and second instruction screen displays is a bottommost displayed text of said each first and second instruction screen displays that is designated with a sequence-position indicating character.

126. The method of claim 98, wherein said text sections of said fist and second instruction screen displays describe successive steps of a process to be carried out relative to said machine.

127. An instruction presentation apparatus for presenting instructional information to a user of at least one machine, said apparatus comprising:

a display;

a processor system for controlling display of text and graphical information on said display, said computer system being adapted to receive a user-initiated command causing change in an output by said display;

a first instruction screen display for display by said display comprising simultaneously displayed text and correlated graphical information, said text information of said first instruction screen display including text describing a first act to be performed on said machine, said correlated graphical information including at least a graphical depiction of said machine; and a second instruction screen display for display by said display also comprising simultaneously displayed text and correlated graphical information, said text information of said second instruction screen display describing a second act to be performed on said machine, wherein text of said second instruction screen display includes at least one distinguishing feature relative to text of said first instruction screen display, said correlated graphical information of said second instruction screen display including a graphical depiction of said machine, wherein graphics of said second instruction screen display include at least one distinguishing feature relative to graphics of said first instruction screen display, wherein said text information of said first instruction screen display and said second instruction screen display describe successive steps of a process to be performed relative to said machine;

wherein said processor system changes an output of said display from said first instruction screen display to said second instruction screen display in response to receipt by said at least one processor system of a command to change an output of said display from said first instruction screen display to said second instruction screen display, and wherein said graphical information of said first instruction screen display and said second instruction screen display highlight successive steps of a process relative to said at least one machine.

128. The apparatus of claim 127, wherein said graphical information of at least one of said instruction screen displays includes a highlight indicia indicting an area on said machine to be acted on during execution of an act described in said text information associated with said graphical information of said at least one of said instruction screen displays.

129. The apparatus of claim 128, wherein said highlight indicia includes an arrow graphic pointing to a specific area of said graphical machine depiction of said graphical information.

130. The apparatus of claim 128, wherein said highlight indicia includes a border outlining a specific area of said graphical machine depiction.

131. The apparatus of claim 128, wherein said highlight indicia includes a specific area of said graphical machine depiction being displayed in a flashing graphics mode.

132. The apparatus of claim 128, wherein said highlight indicia includes a specific area of said graphical machine depiction being displayed in a different color or grey scale from other areas of said machine depiction.

133. The apparatus of claim 128, wherein said highlight indicia includes label indicia indicating an identification of a part or area of said machine depiction.

134. The apparatus of claim 128, wherein said highlight indicia includes a depiction of a specific tool type and its application at a specific location of said graphical machine depiction of said graphical information.

135. The apparatus of claim 134, wherein said highlight indicia further includes label indicia indicating an identification of said tool.

136. The apparatus of claim 127, wherein said graphical information of either of said first or second instruction screen displays includes assembly state indicia illustrating said machine in a partially assembled or partially disassembled state.

137. The apparatus of claim 127, wherein said graphical indicia either of said instruction screen displays includes movement indicia indicating a direction in which a tool is to be moved.

138. The apparatus of claim 127, wherein said graphical information of either of said instruction screen displays included motion indicia indicating motion of a machine or machine part from a first location to a second location.

139. The apparatus of claim 127, wherein said graphical information section of said second instruction display includes assembly state indicia illustrating the state of assembly or disassembly of said machine resulting from an act described in said text information of said first instruction screen display.

140. The apparatus of claim 127, wherein said graphical information of said first instruction display and said second instruction screens display highlight successive steps of a process relative to said at least one machine.

141. The apparatus of claim 127, wherein said at least one processor system includes windowing system capabilities, and wherein said at least one of either of said text or graphical information of said either of said first or second instruction screen displays is presented in a window adapted to present either dedicated text or dedicated graphical information.

142. The apparatus of claim 127, wherein said processor system includes windowing system capabilities, wherein said text information of each of said first and second instruction screen displays is displayed in a text window, and wherein said graphical information of said each first and second instruction screen displays is displayed in a dedicated graphics window.

143. The apparatus of claim 127, wherein said at least one processor system includes a graphical user interface, wherein said at least one of said first or second instruction screen displays includes a control bar, and wherein said processor system receives said command to change an output of said display via said control bar.

144. The apparatus of claim 127, wherein said apparatus includes a control interface for receiving said command to change an output of said display.

145. The apparatus of claim 144, wherein an output of said display changes to a next instruction screen display upon a single actuation of said control interface by a user.

146. The apparatus of claim 144, wherein said control interface is a key of a keyboard.

147. The apparatus of claim 144, wherein said control interface is a displayed control button displayed on said display.

148. The apparatus of claim 144, wherein said control interface is labeled with indicia comprising at least one of an arrow or the word "NEXT."

149. The apparatus of claim 127, wherein said apparatus further includes a "previous instruction screen display" control interface, and wherein said apparatus is adapted to display a previous instruction screen display on said display when said "previous instruction screen display" control interface is actuated by a user.

150. The apparatus of claim 127, wherein said text information of said each first and second instruction screen displays is a bottommost displayed text of said each first and second instruction screen displays that describes an act of a process relative to said at least one machine.

151. The apparatus of claim 127, wherein said text information of said first and second instruction screen displays are designated by consecutive sequence-position indicating characters.

152. The apparatus of claim 127, wherein text of said first instruction screen display is devoid of text describing said second act.

* * * * *